(12) United States Patent
Koo et al.

(10) Patent No.: US 12,423,428 B2
(45) Date of Patent: Sep. 23, 2025

(54) METHOD AND SYSTEM FOR INFERRING DOCUMENT SENSITIVITY

(71) Applicant: Dtex Systems Inc., San Jose, CA (US)

(72) Inventors: Rajan Peng Kiat Koo, Greenhill (AU); William Peter Abbott, Hillcrest (AU); Russell Alan Bruechert, Crafers West (AU); Aditya Mandyam, Fremont, CA (US); Aditya Raghavan, San Jose, CA (US); Andre Costa, Seacliff (AU)

(73) Assignee: DTEX SYSTEMS, INC., San Jose, CA (US)

( * ) Notice: Subject to any disclaimer, the term of this patent is extended or adjusted under 35 U.S.C. 154(b) by 463 days.

(21) Appl. No.: 18/085,658

(22) Filed: Dec. 21, 2022

(65) Prior Publication Data

US 2024/0211599 A1    Jun. 27, 2024

(51) Int. Cl.
  *G06F 21/56* (2013.01)
  *G06F 21/55* (2013.01)
  *G06F 21/57* (2013.01)

(52) U.S. Cl.
  CPC .......... *G06F 21/568* (2013.01); *G06F 21/554* (2013.01); *G06F 21/577* (2013.01)

(58) Field of Classification Search
  CPC ..... G06F 21/568; G06F 21/554; G06F 21/577
  USPC ....................................................... 726/22
  See application file for complete search history.

(56) References Cited

U.S. PATENT DOCUMENTS

| | | | | |
|---|---|---|---|---|
| 8,677,448 | B1* | 3/2014 | Kauffman | G06F 21/6245 726/1 |
| 8,688,601 | B2* | 4/2014 | Jaiswal | G06N 20/00 706/12 |
| 9,558,677 | B2* | 1/2017 | Sadeh-Koniecpol | G09B 19/00 |
| 11,403,411 | B2* | 8/2022 | Shenefiel | G06F 21/554 |
| 11,443,035 | B2* | 9/2022 | Chhabra | H04L 67/306 |
| 2011/0296237 | A1* | 12/2011 | Mandagere | G06F 11/079 714/E11.029 |
| 2012/0303558 | A1* | 11/2012 | Jaiswal | G06N 20/00 706/12 |
| 2014/0173739 | A1* | 6/2014 | Ahuja | G06F 21/577 726/25 |
| 2014/0199664 | A1* | 7/2014 | Sadeh-Koniecpol | G06F 21/564 434/118 |
| 2019/0319987 | A1* | 10/2019 | Levy | H04L 63/08 |
| 2020/0159947 | A1* | 5/2020 | Shenefiel | H04L 63/1425 |
| 2024/0211599 | A1* | 6/2024 | Koo | G06F 21/554 |
| 2024/0394377 | A1* | 11/2024 | Mradul | G06F 21/577 |

* cited by examiner

*Primary Examiner* — Taghi T Arani
(74) *Attorney, Agent, or Firm* — Chamberlain, Hrdlicka, White, Williams & Aughtry; Aly Z. Dossa

(57) ABSTRACT

A method for implementing data loss prevention (DLP) includes: generating an asset lineage map from file system metadata; identifying, based on the asset lineage map, an input feature linked to the asset, a type of the asset, and a plurality of activities linked to the asset; obtaining a sensitivity score for the asset based on the input feature and the type of the asset; obtaining, based on the plurality of activities, a malicious score and a data loss score for the asset; determining a user level of a user; and initiating implementation of a first DLP policy for the user based on the user level, the malicious score, the data loss score, and the sensitivity score.

5 Claims, 13 Drawing Sheets

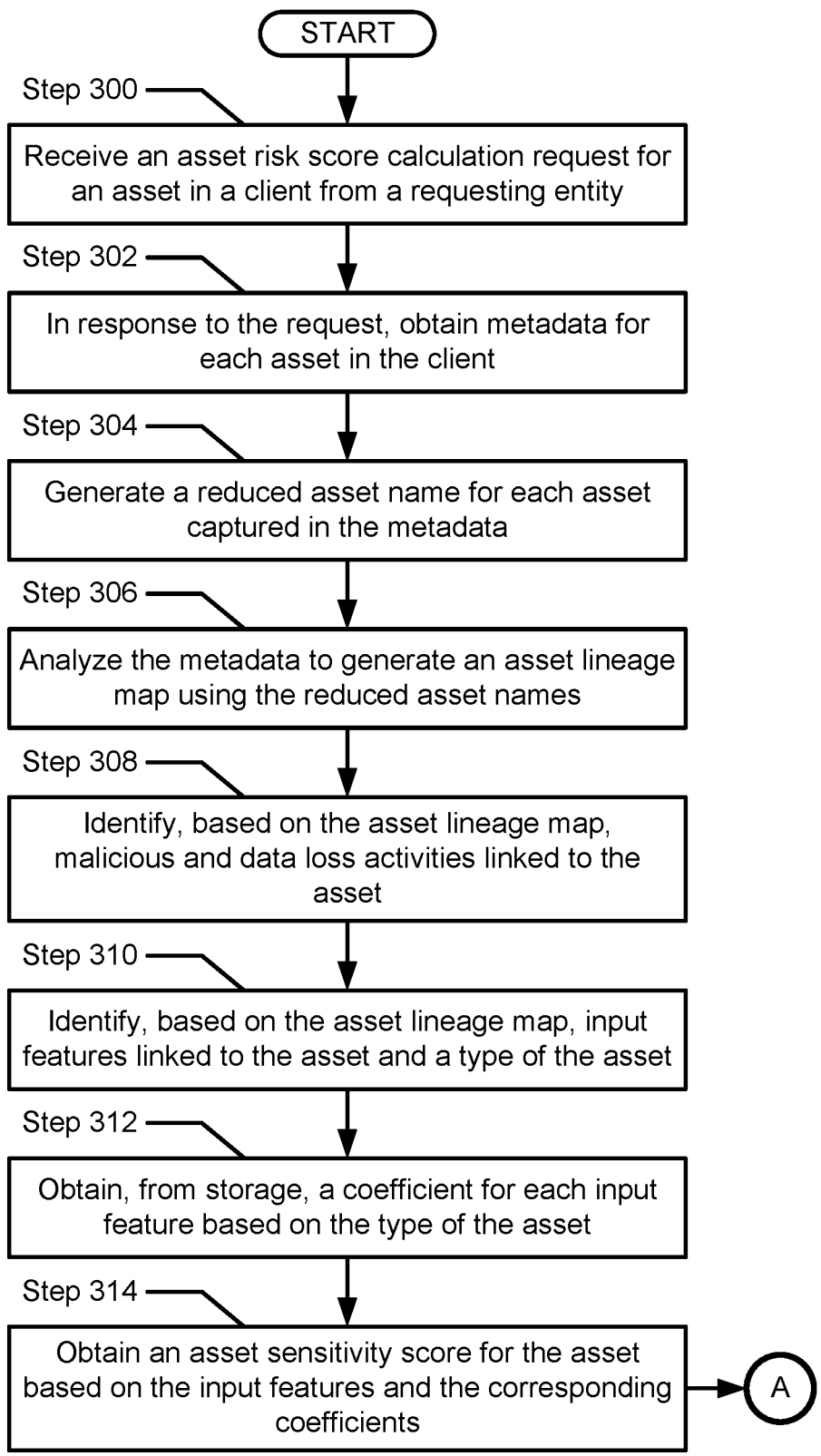
FIG. 3.1

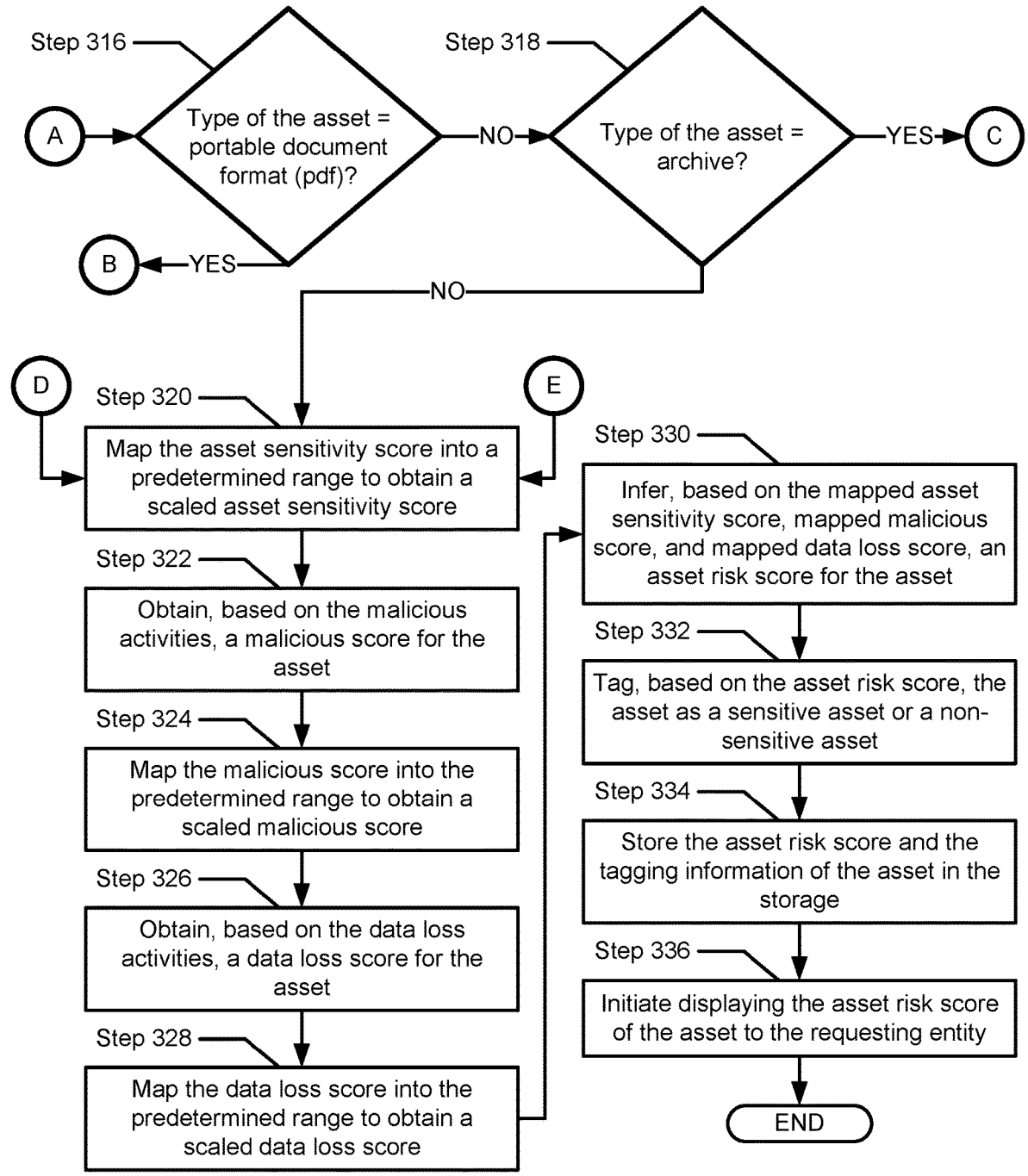
FIG. 3.2

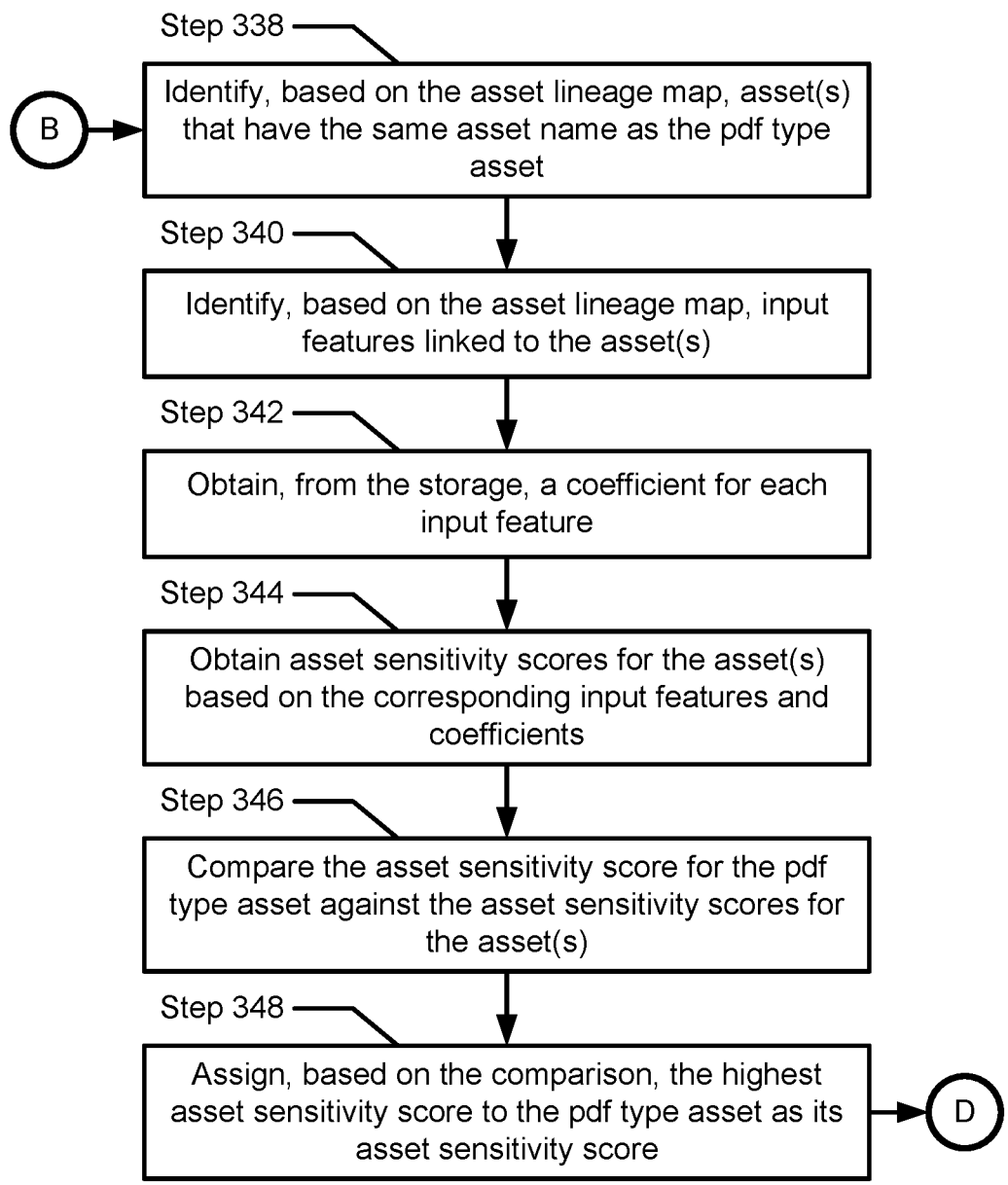
FIG. 3.3

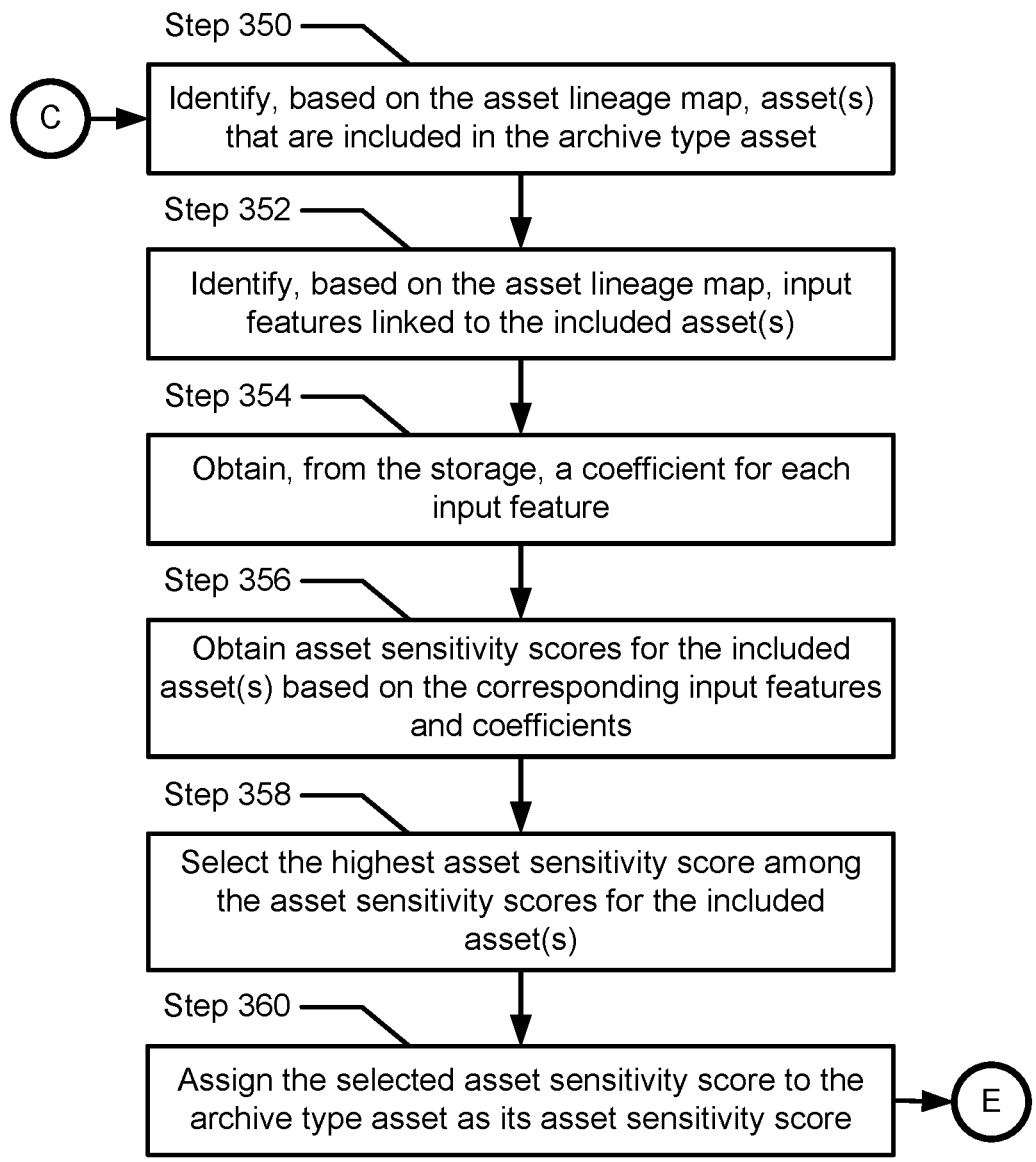
FIG. 3.4

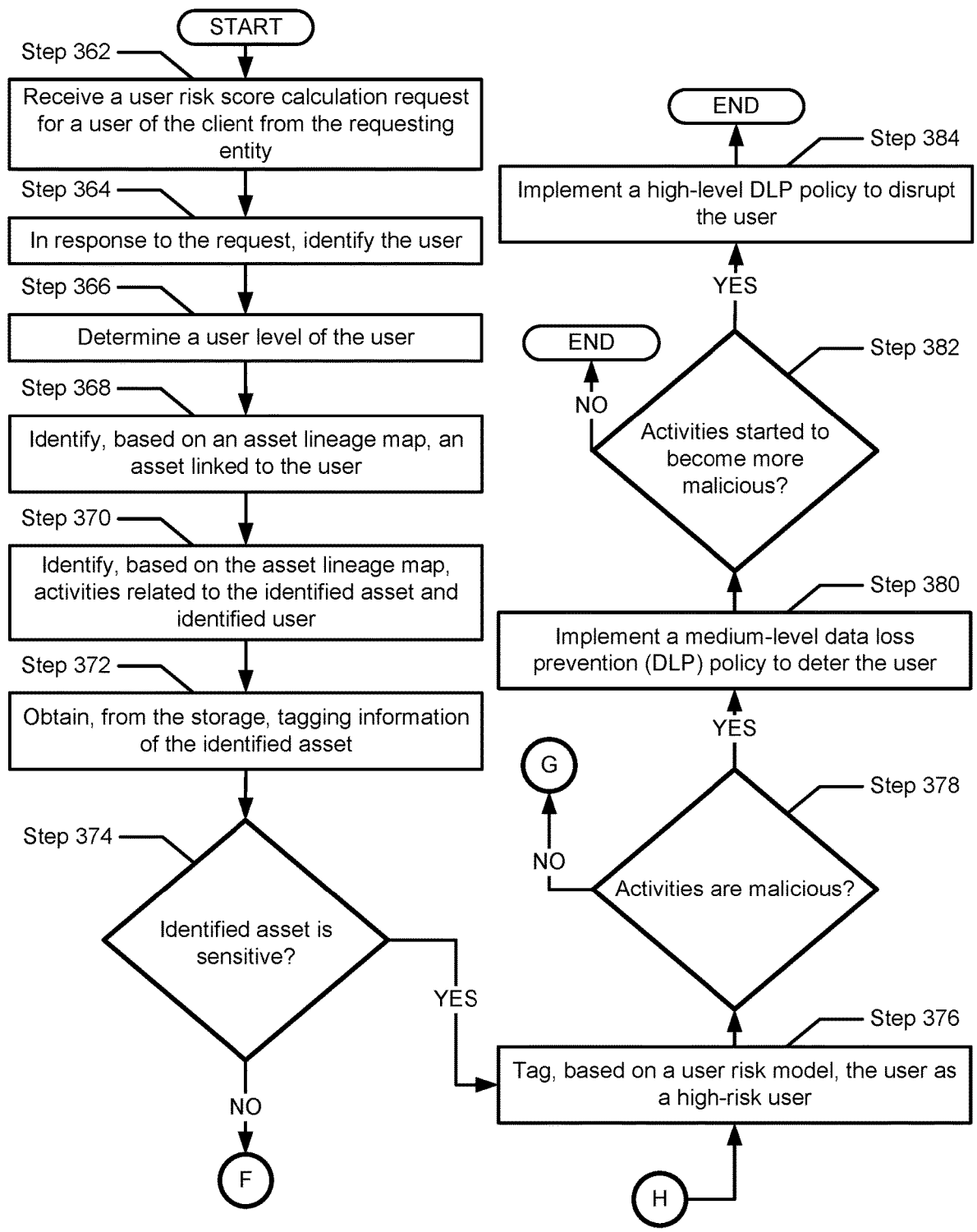
FIG. 3.5

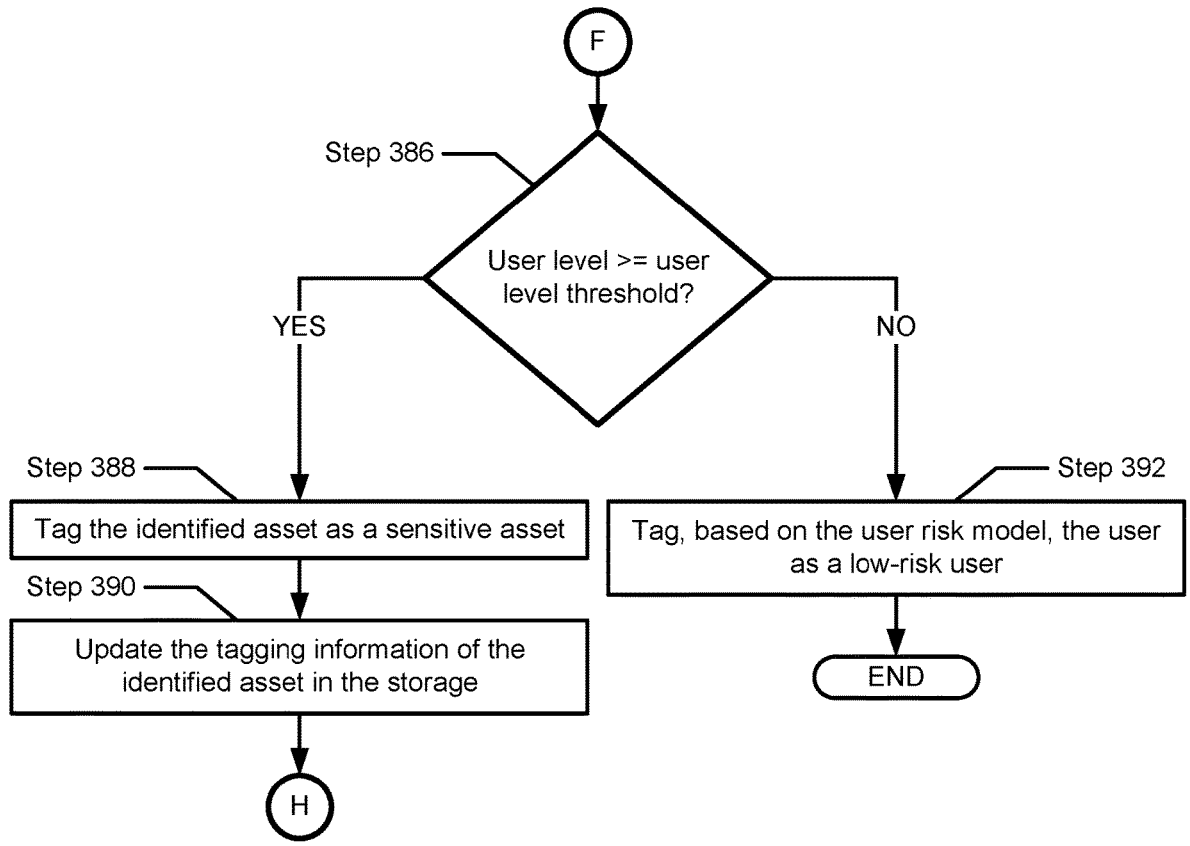
FIG. 3.6

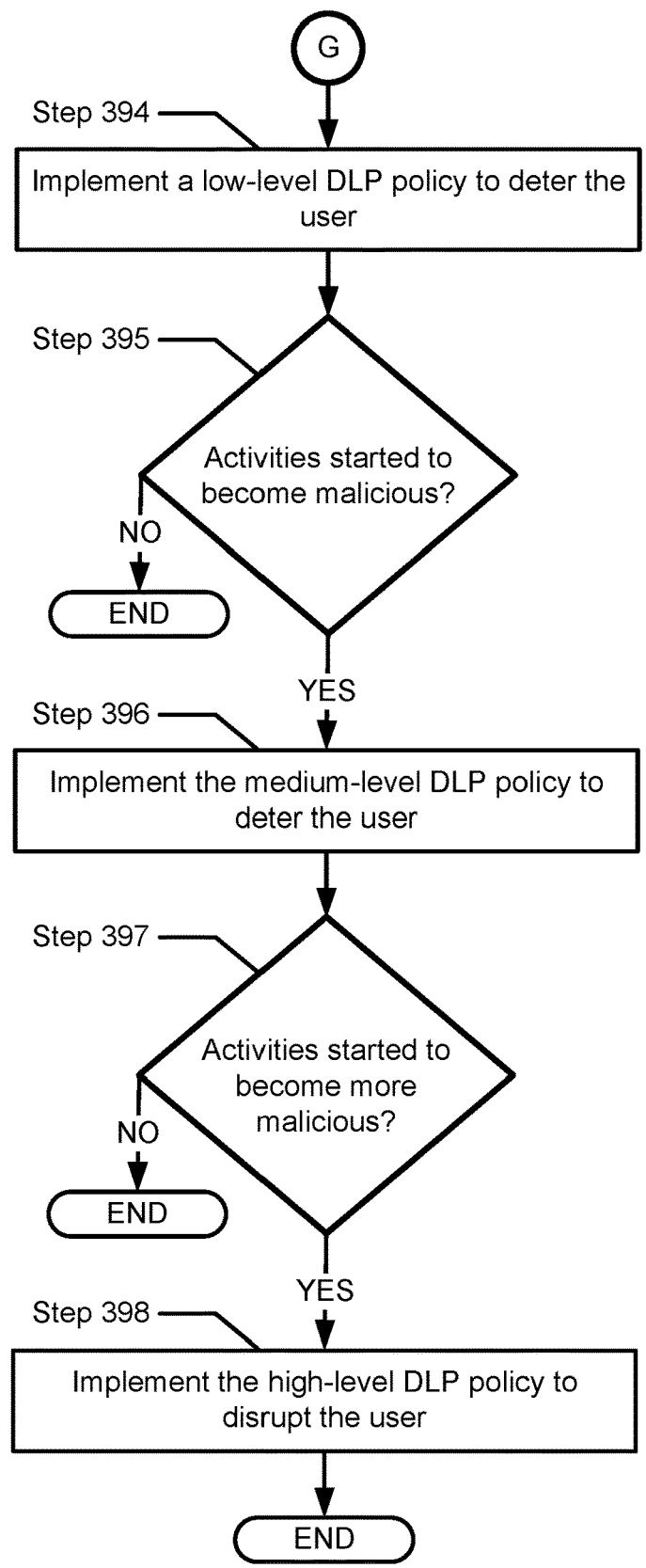
FIG. 3.7

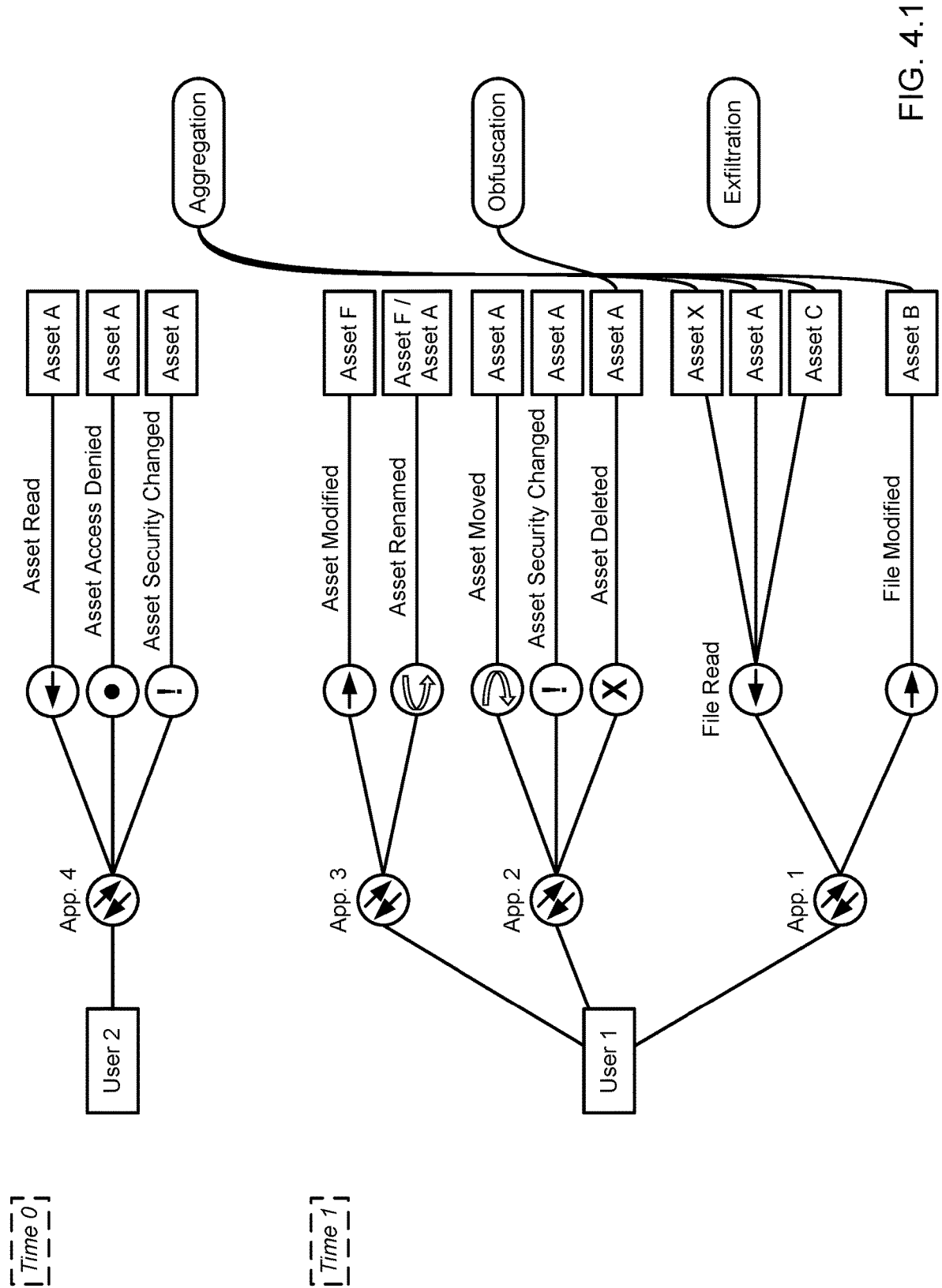
FIG. 4.1

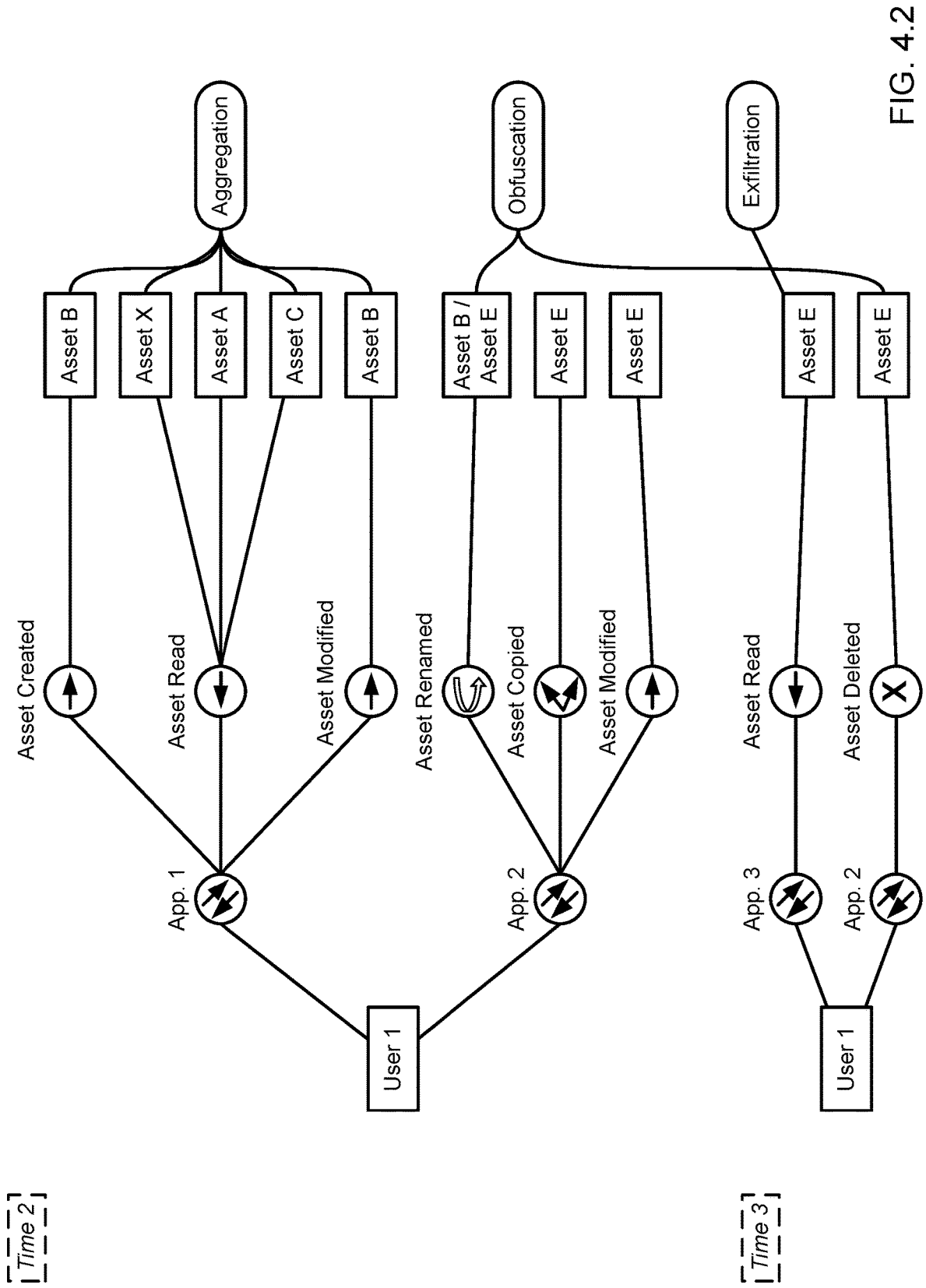
FIG. 4.2

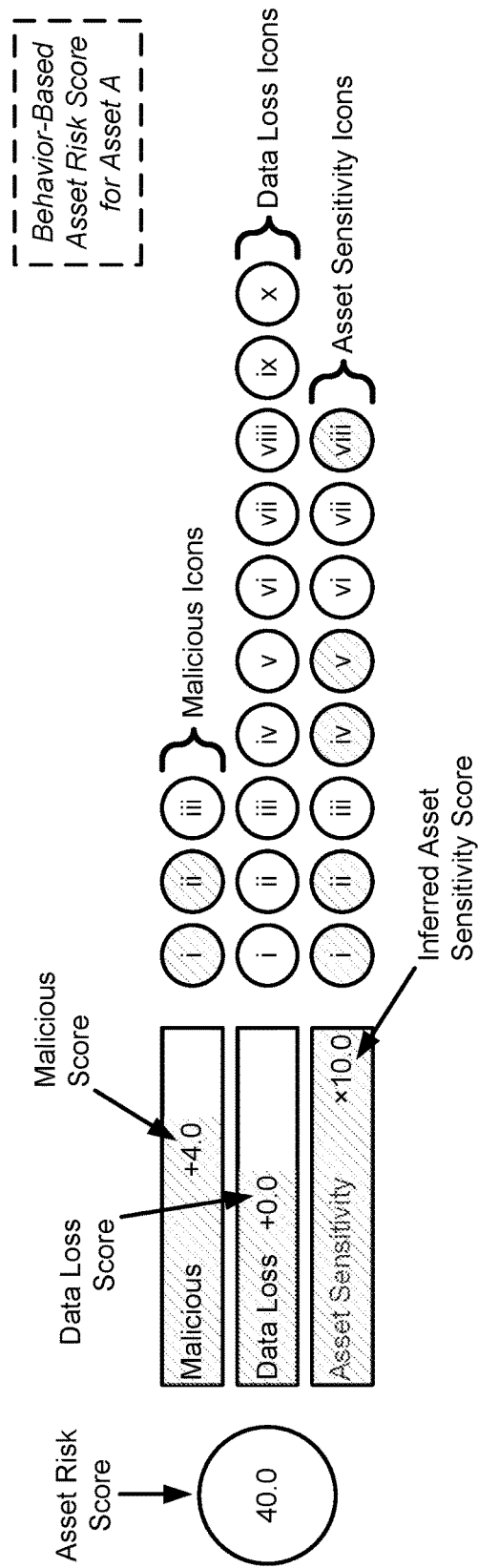
FIG. 4.3
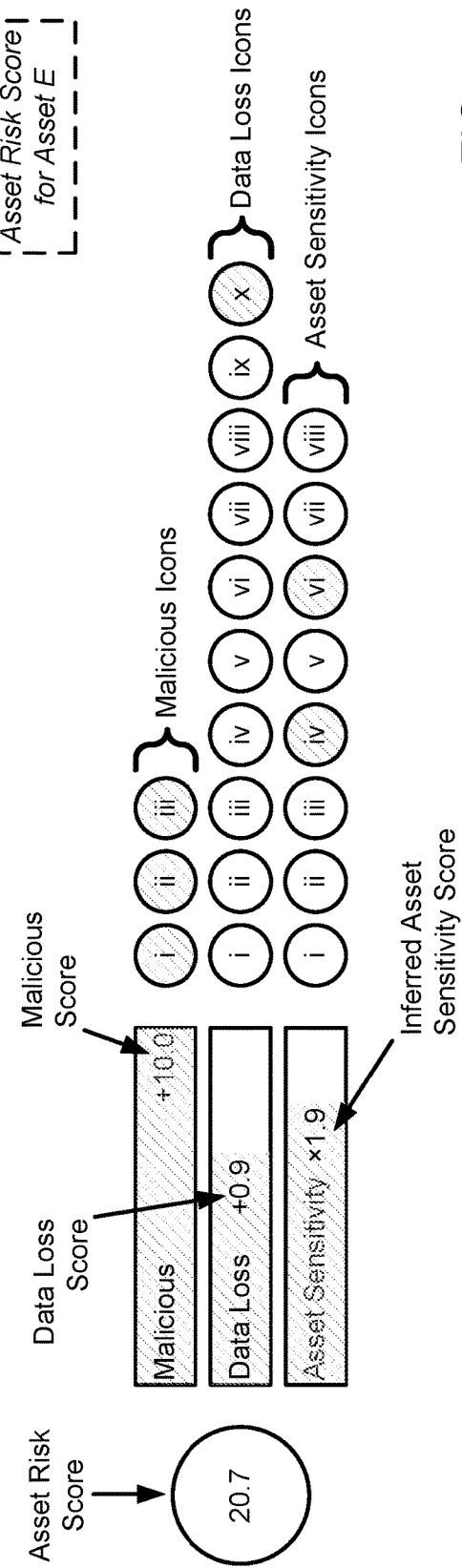
FIG. 4.4

METHOD AND SYSTEM FOR INFERRING DOCUMENT SENSITIVITY

BACKGROUND

Computing devices may provide services. To provide the services, the computing devices may include hardware components and software components. The software components may store information usable to provide the services using the hardware components. Activity on a computing device may be tracked in order to detect behaviors that may pose threats.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.4 show a method for inferring sensitivity of an asset in accordance with one or more embodiments of the invention.

FIGS. 3.5-3.7 show a method for implementing data loss prevention (DLP) in accordance with one or more embodiments of the invention.

FIGS. 4.1 and 4.2 show an asset lineage map of two different assets in accordance with one or more embodiments of the invention.

FIGS. 4.3 and 4.4 show a behavior-based asset risk score for two different assets in accordance with one or more embodiments of the invention.

DETAILED DESCRIPTION

Figure 1:
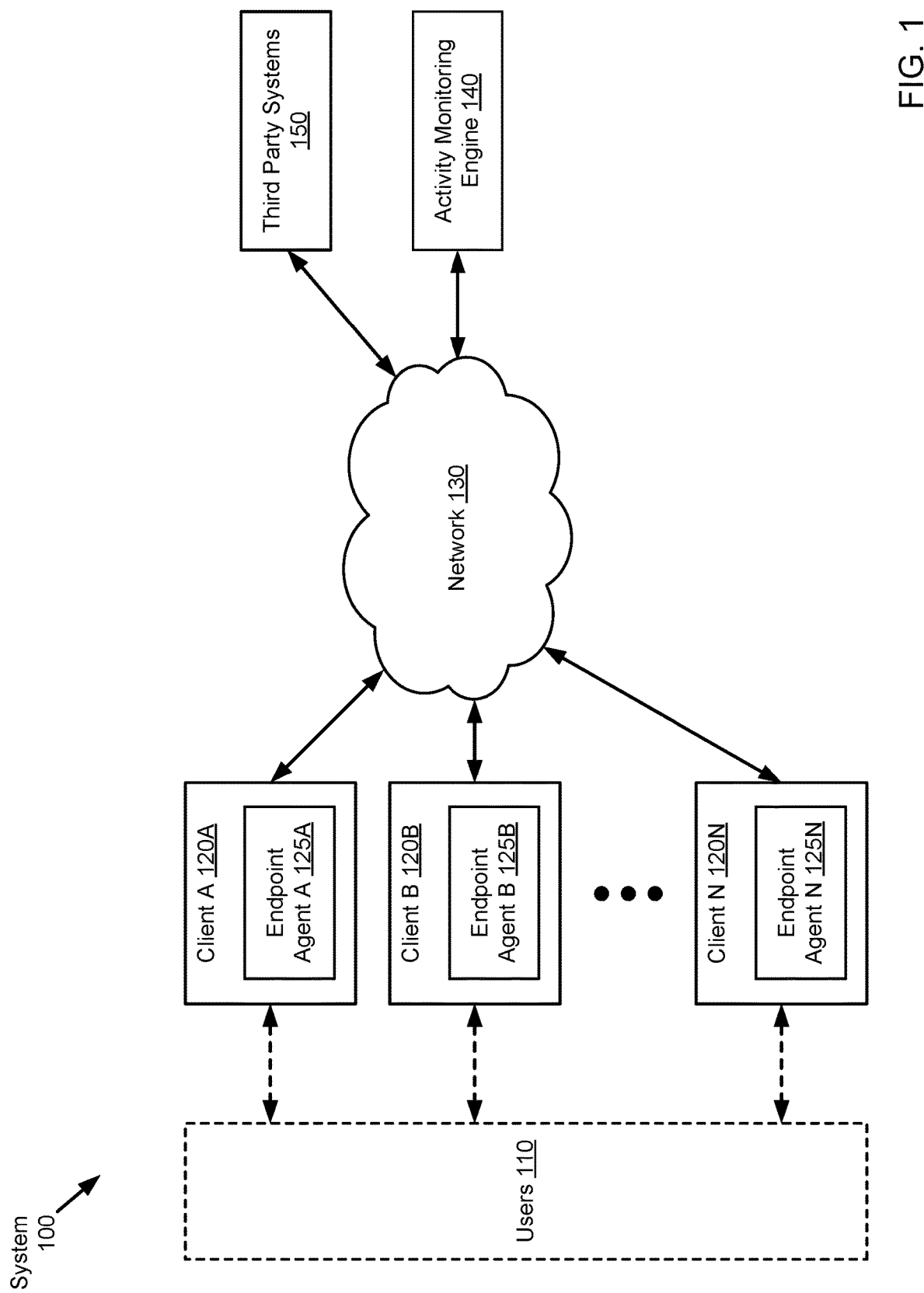
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, assets (e.g., files, folders, etc.) in an organization may need to be tracked when the assets contain a variety of sensitive (e.g., important) information (e.g., data), such as business-critical information, implementation details, or information subject to government regulations (e.g., protected health information (PHI), personal identifiable information (PII), credit card numbers, social security numbers, etc.). Typically, in order to determine (e.g., infer) sensitivity (e.g., commercial value, security risk, confidentiality, etc.) of an asset, contents of the asset may need to be inspected. However, the inspection process may require human intervention (e.g., manual tagging), which may be labor-intensive and prone to human error. Further, in some cases, inspection of certain assets may not be allowed because of the intellectual property information that they include, and this may affect the organization's, for example, long-term development strategies.

Embodiments of the invention relate to methods and systems to automatically infer sensitivity of an asset based on its file system metadata and activities (e.g., behaviors) linked to the asset, without human intervention and/or without inspecting the contents of the asset. The sensitive data profiling feature (i.e., the behavior-based data classification feature) provided by the methods and systems aims to employ a range of linear, non-linear, and/or machine learning (ML) models to determine how sensitive a particular asset is. Based on the sensitivity of the asset and a risk level of a user, the methods and systems may generate DLP alerts and may perform action(s) recommended by a DLP policy (e.g., a deter policy, a disrupt policy, etc.).

More specifically, various embodiments of the invention may generate an asset lineage map from file system metadata. Based on the asset lineage map, an input feature linked to the asset, a type of the asset, and one or more activities linked to the asset may be identified. A sensitivity score for the asset may then be obtained based on the input feature and the type of the asset. Thereafter, based on the activities, a malicious score and a data loss score for the asset may be obtained. A user level of a user may then be determined. Finally, implementation of a first DLP policy for the user may be initiated based on the user level, malicious score, data loss score, and sensitivity score. As a result of the processes discussed below, one or more embodiments disclosed herein advantageously ensure that sensitivity of an asset can be automatically inferred based on its file system metadata and activities linked to the asset, without labor-intensive tagging and/or without inspecting the contents of the asset. Based on the sensitivity of the asset and the risk level of the user, the embodiments also generate DLP alerts and perform action(s) recommended by a DLP policy to provide a secure environment within the organization.

The following describes various embodiments of the invention.

FIG. 1 shows a diagram of a system (100) in accordance with one or more embodiments of the invention. The system (100) includes any number of users (110), any number of clients (120A-120N), a network (130), an activity monitoring engine (140), and third party systems (150). The system (100) may include additional, fewer, and/or different components without departing from the scope of the invention. Each component may be operably connected to any of the other components via any combination of wired and/or wireless connections. Each component illustrated in FIG. 1 is discussed below.

While FIG. 1 shows a specific configuration of the system (100), other configurations may be used without departing from the scope of the invention. For example, although the clients (120A-120N) and the activity monitoring engine (140) are shown to be operatively connected through the network (130), the clients (120A-120N) and the activity monitoring engine (140) may be directly connected, without an intervening network (e.g., 130). As yet another example, although the activity monitoring engine (140) and the third party systems (150) are shown to be operatively connected through the network (130), the activity monitoring engine (140) and the third party systems (150) may be executing on the same host.

Further, the functioning of the clients (120A-120N) and the activity monitoring engine (140) is not dependent upon the functioning and/or existence of the other device(s) in the system (100). Rather, the clients (120A-120N) and the activity monitoring engine (140) may function independently, and perform operations locally that do not require communication with other devices. Accordingly, embodiments disclosed herein should not be limited to the configuration of devices and/or components shown in FIG. 1.

In one or more embodiments, the users (110) may interact with (or operate) the clients (120A-120N), in which each client (120A-120N) may host an endpoint agent (125A-125N) that may generate activity records (e.g., file system metadata) based on a user's interaction with the client. In one or more embodiments, the accessibility of the users (110) to the clients (120A-120N) may depend on a regulation set by the administrators (e.g., a user with permission to make changes on a client that will affect other users of that client). To this end, each user may have a personalized user account that may, for example, grant access to certain data, applications, and computing resources (discussed below) of the clients (120A-120N).

As used herein, a "file system" may be a method in which an operating system (OS) uses to control how data is named, stored, and retrieved. For example, once a user has logged into a computing device (e.g., 500, FIG. 5), the OS of that computing device uses the file system of that computing device to retrieve one or more applications to start performing one or more operations (e.g., functions, tasks, activities, etc.).

In one or more embodiments, a user may have a personalized user account based on the needs of a user. For example, a design engineer may have access to technical design data such as mechanical parts libraries, while not being allowed to access sales data. As yet another example, an employee of the human resources (HR) department may have access to personnel data, while not being allowed to access technical design data and sales data. The aforementioned examples are not intended to limit the scope of the invention.

In one or more embodiments, for example, a user may be automatically directed to a login screen of a client (e.g., 120A, 120B, etc.) when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, once the user has logged into the client, the user may be directed to certain data, applications, and computing resources of the client. For example, based on the type of the user's account (e.g., an HR account, a designer account, etc.), the user may be directed to HR related data, applications, and computing resources. This may be realized by implementing a "virtualization" technology. Virtualization allows for the generation of a virtual machine (VM) that behaves as if it were a physical computing device with its own hardware components. When properly implemented, VMs on the same host (e.g., the client) are sandboxed from one another so that they do not interact with each other, and the data, applications, and computing resources from one VM are not visible to another VM even though they are on the same physical host.

In one or more embodiments, a client (e.g., 120A, 120B, etc.) may be a physical computing device or a logical computing device (e.g., a VM) configured for hosting one or more workloads, or for providing a computing environment (e.g., computing power and storage) whereon workloads may be implemented.

In one or more embodiments, a workload (not shown) may refer to a physical or logical component configured to perform certain work functions. Workloads may be instantiated (e.g., initiated, executed, etc.) and may be operated while consuming computing resources (e.g., processing resources, networking resources, etc.) allocated thereto. Examples of a workload may include (but not limited to): a VM, a container, an application, etc.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

In one or more embodiments, a client (e.g., 120A, 120B, etc.) may include any number of applications (and/or content accessible through the applications) that provide application services to the users (110). Application services may include, for example (but not limited to): database services, electronic communication services, instant messaging services, file storage services, etc. In order to provide application services, each application may host similar or different components. The components may be, for example (but not limited to): instances of databases, instances of email servers, etc. The applications may be executed on one or more clients as instances of the application.

Further, applications may vary in different embodiments, but in certain embodiments, applications may be custom developed or commercial (e.g., off-the-shelf) applications that an organization or a user desires to execute in the clients (120A-120N). In one or more embodiments, applications may be logical entities executed using computing resources of clients (120A-120N). For example, applications may be implemented as computer instructions, e.g., computer code, stored on a persistent storage of the client that when executed by a processor(s) of the client, cause the client to provide the functionality of the applications described throughout this application.

In one or more embodiments, while performing, for example, one or more operations requested by a user, applications installed on a client (e.g., 120A, 120B, etc.) may include functionality to request and use resources (e.g., data, computing resources, etc.) of the client. The applications may perform other types of functionalities not listed above without departing from the scope of the invention.

In one or more embodiments, while providing application services to the users (110), applications may store data that may be relevant to the users in storage/memory resources (discussed below) of a client (e.g., 120A, 120B, etc.). When the user-relevant data is stored, the user-relevant data may be subjected to loss, inaccessibility, or other undesirable characteristics based on the operation of the storage/memory resources.

To mitigate, limit, and/or prevent such undesirable characteristics, the clients (120A-120N) may enter into agreements (e.g., service level agreements (SLAs)) with providers of the storage/memory resources. These agreements may limit the potential exposure of user-relevant data to undesirable characteristics. The agreements may, for example, require duplication of user-relevant data to other locations so that if the storage/memory resources fails, another copy (or other data structure usable to recover the data on the storage/memory resources) of the user-relevant data may be obtained. The agreements may specify other types of activities to be performed with respect to the storage/memory resources without departing from the scope of the invention.

As used herein, a "server" may provide computer-implemented services (e.g., receiving a request, sending a response to the request, etc.) to the users. In one or more embodiments, the request may be, for example (but not limited to): a web browser search request, a computing request, a database management request, etc. To provide the computer-implemented services to the users, the server may perform computations locally and/or remotely. By doing so, the server may utilize different computing devices (e.g., 500, FIG. 5) that have different quantities of computing resources (e.g., processing cycles, memory, storage, etc.) to provide a consistent user experience to the users.

As used herein, a "database" is an organized collection of structured data, typically stored in a computing system. In most cases, a database is controlled by a database management system, in which the data and the database management system (along with the applications that are associated with them) are referred to as a "database system". Data within the database system (simply "database") is typically modeled in rows and columns in a series of tables to make processing and querying efficient. Most databases use structured query language (SQL) for writing and querying data.

In one or more embodiments, the clients (120A-120N) may provide computer-implemented services to the users (110) (and/or other devices such as, other clients or other types of devices). The clients (120A-120N) may provide any number and any type of computer-implemented services (e.g., data storage services, electronic communication services, etc.). To provide computer-implemented services, each client (e.g., 120A, 120B, etc.) may include a collection of physical components (e.g., processing resources, storage/memory resources, networking resources, etc.) configured to perform operations of the client and/or otherwise execute a collection of logical components (e.g., applications, virtualization resources, etc.) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data in a client (e.g., 120A, 120B, etc.). Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in a client (e.g., 120A, 120B, etc.). The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of the client).

In one or more embodiments, each client (e.g., 120A, 120B, etc.) may further include a memory management unit (MMU) (not shown), in which the MMU is configured to translate virtual addresses (e.g., a simulated range of addresses that mimics locations of one or more physical components) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to (i) provide memory protection (e.g., allowing only certain applications to access memory) and (ii) provide cache control and bus arbitration.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client (e.g., 120A, 120B, etc.) with external entities (e.g., other clients, the activity monitoring engine (140), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client (e.g., 120A, 120B, etc.) and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 120A, 120B, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of a client (e.g., 120A, 120B, etc.). The VM (and applications hosted by the VM) may generate data (e.g., VM data) that is stored in the storage/memory resources of the client, in which the VM data may reflect a state of the VM. In one or more embodiments, the VM may provide services to the users (110), and may host instances of databases, email servers, or other applications that are accessible to the users.

In one or more embodiments, a virtualization resource may include a hypervisor, in which the hypervisor may be configured to orchestrate an operation of a VM by allocating computing resources of a client (e.g., 120A, 120B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the client that when executed by processing resources of the client, cause the client to provide the functionality of the hypervisor.

Figure 5:
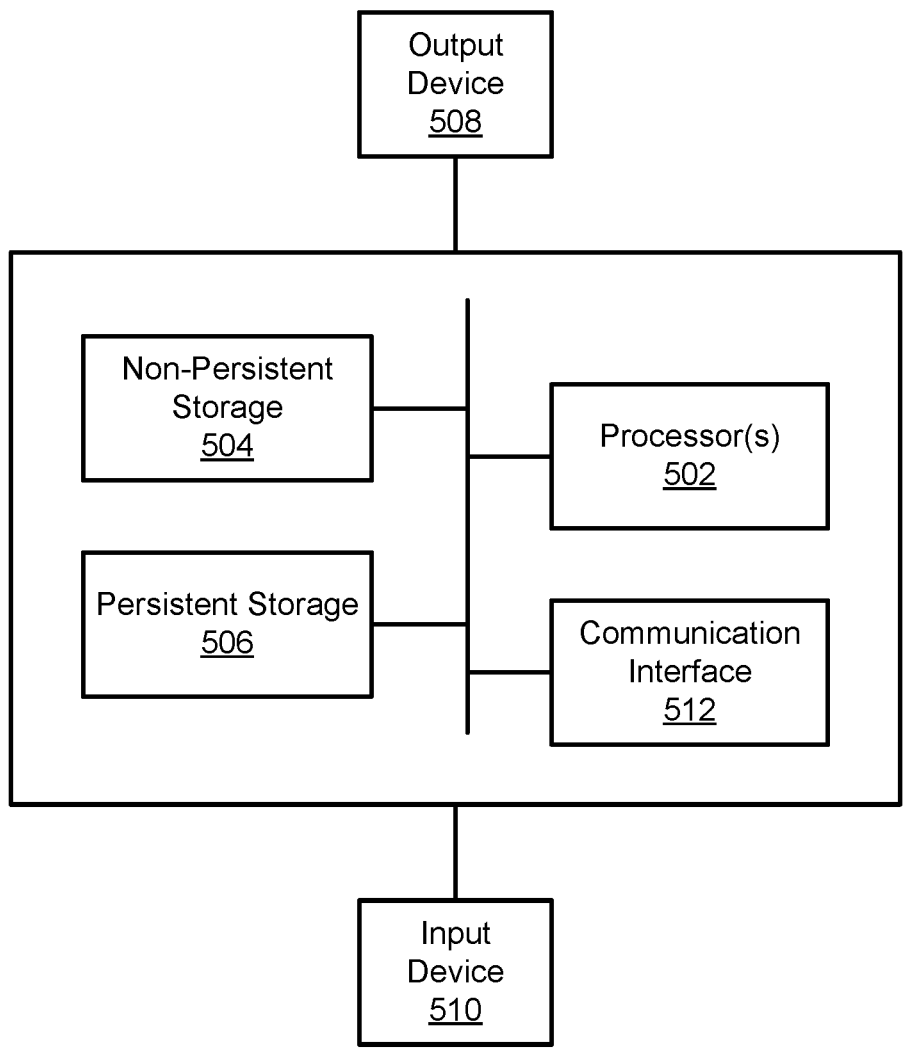
FIG. 5 shows a diagram of a computing device in accordance with one or more embodiments of the invention.

In one or more embodiments, a client (e.g., 120A, 120B, etc.) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the client (e.g., 120A, 120B, etc.) described throughout this application.

Alternatively, in one or more embodiments, the client (e.g., 120A, 120B, etc.) may be implemented as a logical device. The logical device may utilize the computing resources of any number of computing devices to provide the functionality of the client described throughout this application.

In one or more embodiments, the clients (120A-120N) may be used by the users (110) to perform work-related tasks. In some cases, the clients may be abused, for example, by users accessing data in an unauthorized manner, bypassing security measures, using pirated applications and/or media, copying sensitive data on external, removable storage media, etc. In addition, the clients may face organization-external threats, caused, for example, by hacking attacks and/or malware.

As discussed above, each client (120A-120N) may host an endpoint agent (125A-125N). An endpoint agent may be used to monitor an activity on the client hosting the endpoint agent, thereby creating an activity record that documents the activity. Activity records may document an activity with a configurable level of detail. In one or more embodiments, an activity record may document the following file system metadata, for example (but not limited to): date and time an application window is opened, a name of an application being used by a user, information in a title bar of an application, a configurable amount of content in an application window, a user account used to access an application, a file system path in which content was stored, a file system path to which content was stored, data being accessed, data being transferred via a network connection, etc. Accordingly, an activity record may be a string or series of strings that includes file system metadata that documents user activities. Additional details of the file system metadata are described below in reference to FIG. 3.1.

In one or more embodiments, an endpoint agent (e.g., 125A, 125B, etc.) may be operationally connected to the activity monitoring engine (140). For example, the activity monitoring engine (140) may be connected to a client (e.g., 120A, 120B, etc.) via the network (130), thus enabling an endpoint agent (e.g., 125A, 125B, etc.) to provide activity records to the activity monitoring engine (140) for analysis and threat detection. In one or more embodiments, an endpoint agent (e.g., 125A, 125B, etc.) may be software, executing, for example, as a background process on a client (e.g., 120A, 120B, etc.), or combination of software and hardware capable of performing the above tasks.

In one or more embodiments, the network (130) may represent a computing network configured for computing resource and/or data exchange among registered components (e.g., the clients (120A-120N), the activity monitoring engine (140), etc.). As discussed above, components of the system (100) may operatively connect to one another through the network (130) (e.g., a local area network (LAN), a wide area network (WAN), a mobile network, a wireless LAN (WLAN), etc.). In one or more embodiments, the network (130) may be implemented using any combination of wired and/or wireless connections. Further, the network (130) may enable interactions between, for example, the clients (120A-120N) and the activity monitoring engine (140) through any combination of wired and/or wireless network protocols (e.g., TCP, UDP, Internet Protocol version 4 (IPv4), etc.).

The network (130) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more clients (120A-120N) in the network (130), and (iii) limiting communication(s) on a granular level (e.g., on a per-port level, on a per-sending device level, etc.).

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute the network traffic uniformly.

In one or more embodiments, the network-enabled subcomponents may decide how real-time network traffic and non-real-time network traffic should be managed in the network (130). In one or more embodiments, the real-time network traffic may be high priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (130). The non-real-time network traffic may include data packets related to, for example (but not limited to): File Transfer Protocol (FTP) for web publishing, email applications, etc.

In one or more embodiments, the activity monitoring engine (140) may represent a cloud-native analytics server that performs a sensitive data profiling process (based on a request received from an administrator) to calculate, at least, an asset risk score (e.g., sensitivity of an asset) and a risk level of a user by analyzing file system metadata received from the endpoint agents (125A-125N) over the network (130). Based on a risk score of an asset and a risk level of a user linked to that asset, the activity monitoring engine (140) may generate a DLP alert (in case of a threat detection) and may perform mitigating actions (e.g., security measures) recommended by a DLP policy to prevent the threat. In order to mitigate, limit, and/or prevent such threats, the activity monitoring engine (140) may exchange data (related to the detected threat) with the third party systems (150) over the network (130). In turn, the activity monitoring engine (140) may receive one or more instructions (discussed below) from the third party systems (150) specifying which mitigating action should be performed.

One of ordinary skill will appreciate that the activity monitoring engine (140) may perform other functionalities without departing from the scope of the invention. Examples of the activity monitoring engine (140) may include (but not limited to): an enterprise server, a modular server, a blade server, a mainframe, a workstation computer, etc. As shown in FIG. 1, the activity monitoring engine (140) may be a third party physical or virtual server located off-premises, e.g., a cloud-based or remotely located server that may be owned and/or operated by a third party, for example, by a third party providing threat detection as a service. Further, the activity monitoring engine (140) may be an organization-owned and/or operated physical or virtual server, which may be part of the organization's information technology (IT) infrastructure.

In one or more embodiments, the activity monitoring engine (140) may be a heterogeneous set, including different types of hardware components and/or different types of OSs. Additional details of the activity monitoring engine (140) are described below in reference to FIG. 2.

In one or more embodiments, the activity monitoring engine (140) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the activity monitoring engine (140) described throughout this application.

Alternatively, in one or more embodiments, similar to the client (e.g., 120A, 120B, etc.), the activity monitoring engine (140) may also be implemented as a logical device.

In one or more embodiments, the activity monitoring engine (140) is configured to perform all, or a portion, of the functionality described in FIGS. 3.1-3.7.

In one or more embodiments, the third party systems (150) may be provided by companies offering threat detection as a service. Further, the third party systems (150) may be platforms and/or marketplaces for the development and sharing of threat analysis and detection algorithms (e.g., models). Accordingly, the third party systems (150) may interface with the activity monitoring engine (140). In one or more embodiments, when activity records are shared with the third party systems (150), the shared activity records may be anonymized (by the activity monitoring engine (140)), prior to sharing the activity records, in order to avoid revealing resource identities and/or organization-internal information.

In one or more embodiments, the third party systems (150) may contribute to the threat prevention process by performing threat analysis and by recommending one or more instructions (in accordance with a DLP policy) specifying how to mitigate the threat. In one or more embodiments, the activity monitoring engine (140) may make an application programming interface (API) call to the third party systems (150). As described herein, an "API call" may refer to a process of an application or a computing device submitting a request to an API to retrieve the requested data from an external application or an external computing device. Based on receiving the API call (including an activity record and a detected threat, for example, tagging information of an asset, tagging information of a user, behavioral information of a user, etc.) from the activity monitoring engine (140), the third party systems (150) may perform a threat analysis to determine which mitigation step is suitable to prevent the threat. As a response to the API call, the third party systems (150) may then send (or recommend) the suitable threat prevention steps (as instructions) to the activity monitoring engine (140). Based on receiving the instructions, the activity monitoring engine (140) may start to implement the instructions.

In one or more embodiments, the third party systems (150) may determine the suitable threat prevention step(s) based on one or more risk-based adaptive DLP policies available in the third party systems (150). The DLP policies may be, for example (but not limited to): DLP policy—zero trust level 1, DLP policy—zero trust level 2, DLP policy—zero trust level 3, DLP policy—zero trust level 4, etc. In one or more embodiments, each policy may be set by the third party systems (150). Alternatively, each policy may be set by an administrator of the third party systems (150).

As used herein, "zero trust" may refer to a model that provides security against, for example, ransomware and cybersecurity threats by assigning the least required access needed to perform specific tasks. In general, this model operates based on the following principles: (i) always authenticate and authorize based on all available data points (e.g., user identity, user location, computing device health, etc.), (ii) limit user access with just-in-time- and just-enough-access and data protection to secure both data and production workloads, and (iii) minimize blast radius and segment access by implementing end-to-end encryption.

In one or more embodiments, each policy type may include one or more threat mitigation instructions. For example, instructions of "DLP policy—zero trust level 1 (detect)" may specify (but not limited to): user 1 is a low-risk user and user 1 does not normally handle (e.g., touch) sensitive assets, thus no DLP enforcements are needed; user 1 is a low-risk user and user 1 does not normally touch (e.g., read, write, etc.) sensitive assets, thus user 1 can stay in the network; etc. As yet another example, instructions of "DLP policy—zero trust level 2 (deter)" may specify (but not limited to): user 2 is a low-risk user; however, user 2 starts to download assets from a risky website, thus positive DLP enforcements are needed; user 2 is a high-risk user; however, activities of user 2 are non-malicious (e.g., not downloading assets from a risky website), thus teachable moment emails/messages need to be sent to user 2; user 2 is a low-risk user; however, user 2 starts to download assets from a risky website, thus user 2 needs to take a teachable moment security awareness training; etc.

Further, instructions of "DLP policy—zero trust level 3 (deter)" may specify (but not limited to): user 3 is a high-risk user and user 3's activities are non-malicious; however, in general, user 3 acts risky (e.g., frequently travels), thus implement approved device enforcements and more intrusive monitoring (e.g., turn on user 3's webcam, record user 3's screen, etc.) on user 3; user 3 is a high-risk user and user 3's activities are non-malicious; however, user 3 handles sensitive assets, thus implement approved application enforcements and automatically lock user 3's external, removable storage media; etc. As yet another example, instructions of "DLP policy—zero trust level 4 (disrupt)" may specify (but not limited to): user 4 is a high-risk user, user 4 normally handles sensitive assets, and user 4's activities are malicious, thus implement session lock-out enforcements on user 4; user 4 is a high-risk user, user 4 normally handles sensitive assets, and user 4's activities are malicious, thus remove user 4 completely off the organization's network; etc. The aforementioned examples are not intended to limit the scope of the invention.

For example, consider a scenario where the third party systems (150) receive activity records that relate to asset A and user X, which specifies asset A is a non-sensitive asset, user X is an entry-level engineer, and user X's activities are non-malicious (e.g., not trying to conceal asset A, not trying to upload asset A to a risky website, etc.). Because asset A is a non-sensitive asset, a user level of user X is 2/10 (out of 10), and user X's activities are non-malicious, based on DLP policy—zero trust level 1, the third party systems (150) may recommend not implementing DLP enforcements at this time. As yet another example, consider a scenario where the third party systems (150) receive activity records that relate to asset B and user Y, which specifies asset B is a sensitive asset, user B is a lead engineer, and user Y's activities are non-malicious. Because asset B is a sensitive asset, a user level of user Y is 7/10 (above a "risky user" threshold, which is, for example, 6/10), and user Y's activities are non-malicious, based on DLP policy—zero trust level 3, the third party systems (150) may recommend implementing more intrusive monitoring on user Y to collect more data associated with user Y.

As yet another example, consider a scenario where the third party systems (150) receive activity records that relate to asset C and user Z, which specifies asset C is a sensitive asset, user Z is a senior vice president of development, and user Z's activities are malicious (e.g., trying to conceal asset C, trying to copy asset C into a removable storage media, etc.). Because asset C is a sensitive asset, a user level of user Z is 10/10, and user Z's activities are malicious, based on DLP policy—zero trust level 4, the third party systems (150) may recommend removing user Z completely off the organization's network. The aforementioned examples are not intended to limit the scope of the invention.

As discussed above, the activity monitoring engine (140) may implement different levels of user-centric DLP policies on a user to mitigate a detected threat. In this manner, (i) a level of enforcement may be tailored, (ii) instead of taking preventive actions against an asset, the actions may be taken against a user, (iii) other users handling the same asset may not get affected by the actions implemented on the user, and (iv) the actions may not need to be implemented across the population of an organization.

In one or more embodiments, the third party systems (150) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the third party systems (150) described throughout this application.

Alternatively, in one or more embodiments, similar to the clients (120A-120N), the third party systems (150) may also be implemented as logical devices.

Figure 2:
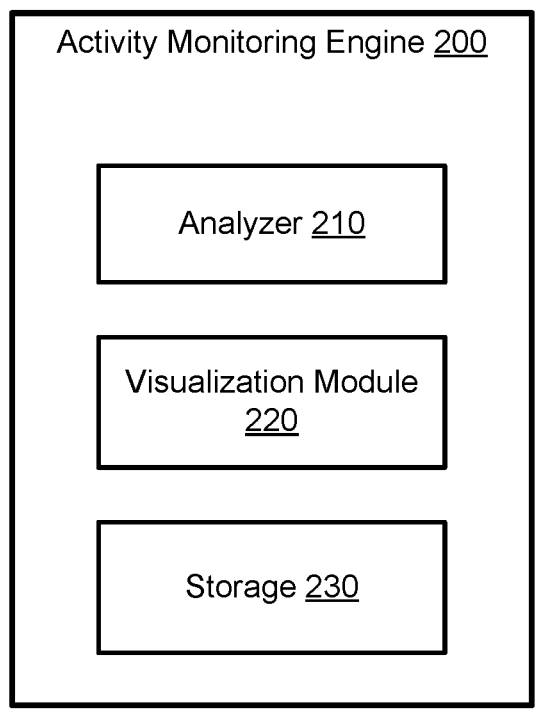
FIG. 2 shows a diagram of an activity monitoring engine in accordance with one or more embodiments of the invention.

Turning now to FIG. 2, FIG. 2 shows a diagram of an activity monitoring engine (200) in accordance with one or more embodiments of the invention. The activity monitoring engine may be the activity monitoring engine discussed above in reference to FIG. 1. The activity monitoring engine may include an analyzer (210), a visualization module (220), and storage (230). The activity monitoring engine (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, as being a cloud-native analytics server, the activity monitoring engine (200) may evaluate, scores, and alerts to anomalies in user interaction with data. More specifically, the activity monitoring engine (200) is an elastic metadata collection, correlation, and analytics engine that provides continuous audit trail of clients (e.g., 120A, 120B, FIG. 1) metadata to observe and record the activities of data, computing devices, applications, and users (e.g., 110, FIG. 1) in near-real-time (e.g., on the order of milliseconds or less).

In one or more embodiments, the analyzer (210) may act as a "behavioral enrichment layer". More specifically, the analyzer (210) may focus on statistical analysis, risk profiling, and implementation of a range of linear, non-linear, and/or ML models. As file system metadata and activities (e.g., webpage session activities, file system activities, network activities, device activities, etc.) arrive to the analyzer (210), they may be decrypted, decompressed, and/or flattened. The metadata and the activities may then be enriched through multiple steps of analysis including (but not limited to): an activity annotation step, an activity correlation step, etc. Additional details of the analysis steps are described below in reference to FIGS. 3.1-3.4.

In one or more embodiments, an "activity annotation" may refer to a functionality where raw activity data is parsed through configurable behavioral profiles (e.g., malicious, data loss, compromised, etc.) to identify activities of interest. These activities may then be annotated (e.g., tagged) for, for example, forensic investigation/reporting and may be marked for further behavioral analysis and anomaly detection routines (e.g., user-to-user, user-to-peer group, and user-to-organization anomalies).

In one or more embodiments, when a collection of sequential activities is expected to occur (e.g., an email link is clicked followed by the download of a suspicious document spawning an unusual process), the "activity correlation" functionality of the analyzer (210) may generate a higher level activity based on, for example (but not limited to): an expected sequence of activities, a projected activity time window, linking data elements, a specified rule trigger, etc. In one or more embodiments, the projected activity time window may be a period of time, with a definite start and end, within which an activity is projected to be completed.

One of ordinary skill will appreciate that the analyzer (210) may perform other functionalities without departing from the scope of the invention. Although the analyzer is shown as part of the activity monitoring engine (200), the analyzer (210) may also be implemented separately in the form of hardware (e.g., circuitry), software, or any combination thereof.

In one or more embodiments, while analyzing the metadata and user activities (e.g., malicious activities, non-malicious activities, etc.) linked to the assets to determine risk scores of assets and risk levels of users, the analyzer (210) may also analyze them to detect potential threats. In one or more embodiments, the analyzer (210) may implement threat detection algorithms to determine whether the metadata and user activities include indication of threats. The threat detection algorithm may evaluate metadata and user activities stored in the storage (230), and if an abnormal (e.g., malicious) activity is detected, the threat detection algorithm may issue an alert (e.g., a DLP alert).

In one or more embodiments, the threat detection algorithm may further quantify the risk resulting from abnormal activities. A higher score (indicating the user is a high-risk user) may indicate an elevated risk thus warranting an alert, whereas a lower score (indicating the user is a low-risk user) may not necessarily trigger an immediate alert. The detection of abnormal activities may be based on a comparison with typical, i.e., expected activities. For example, a user activity (inferred from metadata) may be compared to typical behavior of the user, as per the user's role in the organization. Examples for abnormal user behavior incompatible with the user's role include (but not limited to): an engineer copying a customer list to an external storage device, a salesman copying confidential engineering records to an external storage device, etc.

Alternatively, or additionally, the detection of an abnormal user behavior may be based on a comparison with a historical user behavior and/or data from previous insider-threat cases. For example, an organization's employee that primarily relied on the Internet to research suppliers' products, but recently started to use the Internet in order to contact with direct competitors of the organization may also be considered suspicious. Further, the threat detection algorithm may compare a resource activity documented in an activity record with a historical and/or typical resource activity. For example, a sustained access to a HDD may be considered suspicious if the accessed HDD has historically been mostly idle. Other methods for performing threat detection may be implemented by the analyzer (210) without departing from the scope of the invention. Threat detection may, for example, involve a human operator, e.g., a security expert, performing a manual threat detection and/or a manual review of threats detected by the analyzer (210).

In one or more embodiments, the analyzer (210) may include one or more APIs to permit interaction with the third party systems (e.g., 150, FIG. 1), for example, (i) to share activity records and detected threats with the third party systems, (ii) to access threat analysis algorithms and/or threat detection algorithms developed by the third party systems, and (iii) to download threat detection/analysis algorithms and potentially set them up to replace currently used algorithms.

In one or more embodiments, while the analyzer (210) provides computer-implemented services (e.g., sensitive data profiling/data analysis, threat detection, etc.) to the administrators, the analyzer (210) may store the data analysis and threat detection results (e.g., an asset risk score, a user risk level, tagging information of an asset, tagging information of a user, an asset lineage map, etc.) in the storage (230). When the analysis and threat detection results are stored, the results may be subjected to loss, inaccessibility, or other undesirable characteristics based on the operation of the storage (230).

To mitigate, limit, and/or prevent such undesirable characteristics, administrators of the activity monitoring engine (200) may enter into agreements (e.g., SLAs) with providers of the storage (230). These agreements may limit the potential exposure of the results to undesirable characteristics. The agreements may, for example, require duplication of the results to other locations so that if the storage (230) fails, another copy (or other data structure usable to recover the data on the storage (230)) of the results may be obtained. The agreements may specify other types of activities to be performed with respect to the storage (230) without departing from the scope of the invention.

Further, the analyzer (210) may include a set of software modules that is operatively connected to the endpoint agents (e.g., 125A-125N, FIG. 1) via the network (e.g., 130, FIG. 1), thus enabling the analyzer (210) to obtain activity records from the endpoint agents (e.g., 125A-125N, FIG. 1). In one or more embodiments, the software modules may be implemented in a distributed manner, in which the functionalities of the analyzer (210) are performed by separate workers, i.e., separate computing devices. The workers may be, for example, the clients (e.g., 120A-120N, FIG. 1). In such a scenario, a version of the analyzer (210) that is configured for (i) distributed analysis of activity records and (ii) distributed threat detection from the activity records may be included in the endpoint agents (e.g., 125A-125N, FIG. 1). Alternatively, the workers may be cloud-based, e.g., being hosted by Amazon Web Services®, or they may be provided by a third party performing distributed data analysis and threat detection as a service.

In one or more embodiments, data analysis and threat detection may be performed locally by the endpoint agents (e.g., 125A-125N, FIG. 1) or by an associated process executing on the same clients (e.g., 120A-120N, FIG. 1) on which the endpoint agents (e.g., 125A-125N, FIG. 1) are executing. In such scenarios, the endpoint agents (or an associated process) may perform methods shown in FIGS. 3.1-3.7 and then provide the analysis and threat detection results to the analyzer (210). The analyzer (210) may then store the results in the storage (230).

In one or more embodiments, multiple analyzers and/or a single analyzer with multiple data analysis and threat detection stages may be implemented by the activity monitoring engine (200), for example, in order to obtain different degrees of analysis and threat detection. The analyzers or stages of the analyzer may be connected serially, thereby incrementally increasing the degree of data analysis and threat detection as an activity record is sequentially processed by the analyzers or stages of the analyzer. Alternatively, the analyzers or stages of the analyzer may operate in parallel on an activity record, with each analyzer or stage performing data analysis and threat detection of the activity record to a different degree.

In one or more embodiments, the analyzer (210) may be configured to perform at least some of the steps of the methods described in FIGS. 3.1-3.7.

In one or more embodiments, the storage (230) may include only a set of recently obtained activity records (e.g., metadata, user activities, etc.), analysis results, and threat detection results (simply "records and results"), or the storage (230) may include a cumulative history of the records and results obtained over a prolonged period of time. Further, the storage (230) may receive all records and results (generated by the analyzer (210)). Alternatively, multiple storages may exist, in which the records and results are stored in a particular storage (e.g., storage A, storage B, etc.), depending on the origin of them. For example, storage A may only store results originating from a particular corporate division (e.g., HR department, accounting, etc.).

In one or more embodiments, multiple storages may be employed in order to store records and results that have been tagged with different levels (e.g., degrees). For example, one storage (e.g., storage C) may store results that include information relating to "sensitive" assets, whereas a separate storage (e.g., storage X) may store results that include information relating to "non-sensitive" assets. Depending on the information that they include, multiple storages may be "access protected" to various degrees. For example, a storage that contains information relating to sensitive assets may be accessible by a limited group of authorized viewers, thus requiring a strong access protection, whereas a storage that contains information relating to non-sensitive assets may be accessible by a larger group of authorized viewers, and therefore may require only basic access protection. In one or more embodiments, for example, before sending an API call to the third party systems (e.g., 150, FIG. 1), the analyzer (210) may add an administrator of the third party systems to the larger and/or limited group of authorized viewers so that the third party systems may perform faster threat analysis.

In one or more embodiments, the storage (230) may be a storage or memory resource. Details of the storage or memory resource have been described above in reference to FIG. 1.

In one or more embodiments, the visualization module (220) may serve as a GUI providing access to various details of, for example (but not limited to): an asset lineage map of an asset, a behavior-based asset risk score for an asset, an instruction specifying how to mitigate a detected threat, threat-related information, etc. The visualization module (220) may further include configurable filters that allow selective displaying of threats, potential threats, and threat-related information. For example, a filter may be used to display only threat-related information related to activities of a particular user, or a groups of users. In addition, a filter may be configured to suppress alerts for abnormal activities where the asset risk score does not exceed a set threshold.

In one or more embodiments, the visualization module (220) may further display de-anonymized or partially de-anonymized versions of anonymized activity records. The amount of de-anonymization may depend on the administrator's level of authorization, and may range from complete de-anonymization, for an administrator that is fully authorized to view sensitive user data, to no de-anonymization if the administrator is only equipped with basic viewing privileges.

In one or more embodiments, the visualization module (220) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the visualization module (220) described throughout this application.

Alternatively, in one or more embodiments, similar to the client (e.g., 120A, FIG. 1), the visualization module (220) may also be implemented as a logical device.

FIGS. 3.1-3.4 show a method for inferring sensitivity of an asset in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed activity monitoring engine (e.g., 140, FIG. 1). Other components of the system (100) illustrated in FIG. 1 may also execute all or part of the method shown in FIG. 3.1 without departing from the scope of the invention.

In Step 300, the activity monitoring engine receives an asset risk score calculation request for an asset in a client (e.g., 120A, FIG. 1) from an administrator (e.g., a requesting entity) of the client over the network (e.g., 130, FIG. 1). In one or more embodiments, the requesting entity sends the request because of an alert (e.g., a predictive alert, a proactive alert, a technical alert, etc.) triggered in the client, and the requesting entity does not want to lose any data on that client, for example, to malicious insiders or credential thieves. The alert may specify, for example (but not limited to): a compromised user is detected, a malicious user activity is detected, etc.

In one or more embodiments, the alerts may be defined by a vendor of that client, by the administrator, by another entity, or any combination thereof. The alerts may be defined based on a DLP policy.

In one or more embodiments, the asset may be any type of file or folder, and it may be in any format. Non-limiting examples of the asset may include: a Microsoft® Word file (e.g., a doc/docx file), a Microsoft® PowerPoint file (e.g., a ppt/pptx file), a Microsoft® Excel file (e.g., an xls/xlsx file), an Adobe® Portable Document Format (PDF) file, a PKWARE® zip/rar file, an archive file, etc.

In Step 302, in response to the request (received in Step 300), the activity monitoring engine obtains file system metadata for each asset in the client. In one or more embodiments, the metadata may be obtained, for example, by the endpoint agent (e.g., 125A, FIG. 1) pushing the metadata as it becomes available, or by the activity monitoring engine polling the endpoint agent (e.g., by making an API call to the agent) for new metadata. Based on receiving the API call from the activity monitoring engine, the endpoint agent may allow the activity monitoring engine to obtain the metadata.

The metadata may be obtained (or streamed) continuously (without affecting production workloads of the client), as they generated by the endpoint agent, or they may be obtained in batches, for example, in scenarios where (i) the activity monitoring engine receives an asset risk score calculation request, (ii) the endpoint agent accumulates metadata and provides them to the activity monitoring engine at fixed time intervals, or (iii) the endpoint agent stores metadata in the storage (e.g., 230, FIG. 2) or in an external database, and notifies the analyzer (e.g., 210, FIG. 2) to access the metadata from the storage or from the database. In one or more embodiments, the metadata may be access-protected for the transmission from the endpoint agent to the activity monitoring engine, e.g., using encryption.

In one or more embodiments, the metadata may include, for example (but not limited to): an identifier of an asset, an identifier of a parent folder containing an asset, a size of an asset, an offset for data of an asset stored in storage, one or more attributes of an asset, an access control list (ACL) of an asset, a discrete file system activity data that is recorded in an endpoint agent, a type of an asset, a number of users interacting with an asset, a number of asset size changes, etc.

In one or more embodiments, the identifier of the asset may be a name (e.g., file_1.xlsx, file_2.pdf, etc.) of the asset. In one or more embodiments, a parent folder may be a folder that is one level higher than a current directory of an asset in a file system hierarchy. In this manner, the identifier of the parent folder may specify the assets included in the parent folder. For example, the identifier of the parent folder may be folder_3/file_2, which specifies that folder_3 contains file_2.

In one or more embodiments, the size (e.g., 50 Megabytes (MB), 50 Gigabytes (50 GB), etc.) of the asset may specify how much storage volume the asset consumes. In one or more embodiments, the offset for the data of the asset may be a pointer that points to one or more blocks of storage that store the data. For example, if the offset points blocks 3 and 6 store the data, the analyzer should access blocks 3 and 6 to obtain the data from the storage.

In one or more embodiments, the attribute(s) of the asset may specify one or more characteristics of the asset. The attribute(s) of the asset may also specify how the file system should manage the asset, for example (but not limited to): asset A should be read-only, asset B should be hidden, etc.

In one or more embodiments, the ACL of the asset may be a list of permissions that defines which user has access to the asset. For example, the ACL of the asset may specify that a user with a user level of 7 (out of 10) or above can access the asset.

In one or more embodiments, file system activity data (recorded in the endpoint agent) may specify, for example (but not limited to): a timestamp of an activity (e.g., Aug. 27, 2022, 02:27:30.460 a.m.), an identifier of a user who interacted with an asset (e.g., domain\user1), an identifier of a computing device (e.g., domain\EVO-DO5884), an application name (e.g., Microsoft® Excel.exe, Microsoft® Edge.exe, Google® Chrome.exe, Adobe® Acrobat.exe, PKWARE® zip.exe, etc.), a product identifier of an application, a type of an activity (e.g., asset read, asset created, asset modified, asset renamed, asset copied, asset deleted, asset access denied, asset security changed, asset moved, etc.), a description of an activity (e.g., (C:)\\sub.domain.com\users\user 2\file2.docx→(C:)\\sub.domain.com\users\user2\file55.pdf), an identifier of a source asset (occurs when an asset relates to file system operations), an identifier of a target asset (occurs when an asset relates to file system operations), a directory of a source asset (\\users\demo_user_AL\desktop\confidential_design_files), a product identifier of a storage device hosting a target asset (e.g., VMware® virtual NVMe disk), a version of an endpoint agent (e.g., 4.5.1 build 3 (release/4.6.8-9b6744s)), a media access control (MAC) address of a computing device, a type of a computing device, an identifier of an OS (e.g., Microsoft® Windows) executing on a computing device, a network connectivity detail (e.g., a network identifier, a category of the network, etc.), a type of a file system (e.g., a new technology file system (NTFS), a resilient file system (ReFS), etc.), etc.

In one or more embodiments, after obtaining the metadata for each asset, contents of each asset may be hashed (e.g., a process of transforming any given string of characters into another value) only once for faster and efficient asset lineage map generation (see Step 306). For example, the activity monitoring engine may hash contents of each asset in order to track the identity of each content, whereas each asset movement activity performed by an OS of an endpoint may be tracked by file system activities (e.g., file renamed, file moved, file name changed, etc.). As yet another example, the activity monitoring engine may hash every asset deletion activity performed by an OS of an endpoint. In this manner, for example, the activity monitoring engine may track (i) different versions of the same asset and (ii) various changes applied to an asset as opposed to just asset name changes.

In one or more embodiments, in order to hash a content of an asset, the activity monitoring engine may implement, for example (but not limited to): a secure hash algorithm (SHA)-1 hash function, a SHA-256 hash function, locality-sensitive hashing (LSH) algorithm, etc.

As used herein, the "LSH" algorithm enables identification of two similar assets (e.g., different versions of a given asset) by analyzing the hashed contents. In this manner, (i) all assets (e.g., earlier and/or later versions with content added, modified, and/or deleted) similar to a given sensitive asset may be determined and (ii) an asset lineage map may be generated. Comparing to the LSH algorithm, conventional hashing functions (e.g., the SHA-1 hash function) may only be used to establish whether the contents of two assets are identical.

In Step 304, the activity monitoring engine generates a reduced asset name for each asset captured in the metadata.

In one or more embodiments, the activity monitoring engine may use a reduced asset name in place of plain asset names in order to account for minor variations in the asset name, as different versions of the same asset may exist with, for example, different version numbers, different date suffixes, etc. For example, "my_spreadsheet_v1.xlsx" and "my_spreadsheet-04/15/2022.xlsx" may be count as the same asset via the reduced asset name "myspreadsheet.xlsx".

In Step 306, the activity monitoring engine analyzes the metadata (obtained in Step 302) to generate (e.g., to structure) an asset lineage map (e.g., a map including historical file system activities linked to the asset). In order to generate an asset lineage map, the activity monitoring engine may analyze, for example, approximately 5000 discrete daily activities recorded in the metadata. In one or more embodiments, while generating the asset lineage map, the activity monitoring engine may use, for example (but not limited to): a reduced asset name of an asset, a source asset name, a target asset name, a hash of a file system activity, a correlated activity between two assets, a directory of an asset, an identifier of a parent folder containing an asset, an ACL of an asset, a number of asset size changes, etc.

In one or more embodiments, a size of an asset may change over time as users edit the asset and make changes, in which the size of the asset may increase or decrease at any time. While analyzing the metadata, the activity monitoring engine may consider the maximum asset size ever seen for the asset to date.

Further, by generating the asset lineage map of the asset, the activity monitoring engine may go back in time and infer the full history of the asset from a forensics perspective (see FIGS. 4.1 and 4.2). In this manner, for example, the activity monitoring engine may infer who generated the asset (e.g., the asset generator) and how the extension of the asset is changed over time. As yet another example, the activity monitoring engine may also infer which user duplicated the asset and uploaded to an unauthorized asset sharing website using Google® Chrome.exe. Additional details of the asset lineage map are described below in reference to FIGS. 4.1 and 4.2.

In Step 308, based on the asset lineage map (generated in Step 306), the activity monitoring engine identifies malicious and data loss activities linked to the asset. In one or more embodiments, malicious activities may be grouped under one or more categories, for example (but not limited to): reconnaissance, circumvention, obfuscation, aggregation, exfiltration, etc. Each category may specify one or more alerts associated with the activities, for example (but not limited to): (i) obfuscation—data archive creation and deletion, obfuscation/behavioral—unauthorized asset access attempt, obfuscation/behavioral—unconfirmed asset downloaded, obfuscation/behavioral—asset with sensitive asset extension downloaded, obfuscation—suspicious archive asset renaming, obfuscation—data encrypted, obfuscation/aggregation—asset archive generation modified, obfuscation/behavioral—asset extension transfer (e.g., asset duplication), obfuscation/compromised signed binary proxy execution, obfuscation/behavioral—circumvention target process, obfuscation/compromised—command line interface execution, obfuscation—excessive asset deletion: greater than 50 unique assets; (ii) reconnaissance—security bypass research; (iii) aggregation—compressed data, aggregation/behavioral—exfiltration archive collected data generation, aggregation—compressed data+movement of archive assets, aggregation—data archiving, aggregation—screen capture software; (iv) exfiltration/data loss—attempt to transfer an asset to an unauthorized removable storage media, exfiltration—obfuscated Internet asset upload, exfiltration—archive collected data movement, exfiltration—personal webmail correlation, exfiltration—archive collected data archive generation, exfiltration—asset transfer protocol, data loss/exfiltration—abnormal transfer: sum of exfiltrated asset size greater than 350 MB, exfiltration—remote access utility upload, exfiltration/data loss—asset sharing website network activity; etc.

In one or more embodiments, data loss activities may specify one or more alerts, for example (but not limited to): data loss/exfiltration—attempt to upload an asset to an unauthorized asset sharing website, data loss/behavioral—exfiltration asset read via browser, data loss/exfiltration—unusual print by count, data loss/exfiltration—personal webmail, data loss/exfiltration—archive collected data, data loss/exfiltration—posting data to website, data loss—obfuscated asset upload, etc.

In one or more embodiments, based on the asset lineage map, the activity monitoring engine may identify additional activities linked to the asset and/or linked to a user who interacted with the asset. The additional activities may be, for example (but not limited to): compromised activities, non-malicious activities, behavioral activities, etc. In one or more embodiments, the additional activities may specify one or more alerts, for example (but not limited to): (i) compromised/data loss—potential exfiltration hypertext transfer protocol (http) request, compromised—permission groups discovery, compromised—network service scanning, compromised—risky application (e.g., Microsoft® PowerShell) execution, compromised—risky scripting application execution, compromised—security software discovery, compromised—application management instrumentation execution; (ii) non-malicious/behavioral—unapproved applications, non-malicious—behavior negligence webmail access, non-malicious—reconnaissance website blocked by an external tool, non-malicious/behavioral—pirated media website, non-malicious/behavioral—negligence: asset name with password in title; (iii) behavioral—flight risk, behavioral—first seen removable computing device; etc.

In Step 310, based on the asset lineage map, the activity monitoring engine identifies (i) input features linked to the asset and (ii) a type of the asset. More specifically, the activity monitoring engine may derive the input features from the content of the metadata. In one or more embodiments, the input features may be, for example (but not limited to): a number of unique users interacting with an asset (simply "unique users"), a ratio of key users to non-key users that interact with an asset (simply "unique key users"), size of an asset (simply "maximum asset size"), a number of unique activities associated with an asset (simply "unique tags"), a number of unique versions of an asset across an organization (simply "asset version changes"), a number of pre-determined sensitive keywords in a name of an asset (simply "high sensitivity keywords"), a number of pre-determined non-sensitive keywords in a name of an asset (simply "low sensitivity keywords"), match against a pre-determined list of known sensitive assets (simply "known sensitive assets"), etc.

In one or more embodiments, (i) less "unique users" may indicate that the asset is confined to a smaller distribution group and potentially more sensitive; however, if a non-linear model is used to obtain an asset sensitivity score for the asset (discussed more in Step 314), the effect of "unique users" in the non-linear model may be decreased after a certain number of unique users (e.g., may not increase the asset sensitivity score after a certain number of unique users); (ii) key users (e.g., users that are part of an executive team, a senior security team, etc.) in the "unique key users" may be the users with a higher propensity to handle sensitive assets and they may be predefined by the organization (or may be inferred using other means); (iii) "maximum asset size" may refer to maximum size of an asset over the lifetime of that asset, which may be proportional to sensitivity of an asset (by taking into account an average asset sized of different asset extensions); (iv) "unique tags" may be related to malicious or data loss activities, in which a greater range of unique tags associated with an asset may heightens its risk score; (v) "asset version changes" may be determined by unique asset sizes detected for an asset (e.g., same reduced asset name, different source asset size), in which more asset versions may indicate work and effort being put into the asset, and that may increase its importance and therefore sensitivity; (vi) "high sensitivity keywords" may be used to increase an asset sensitivity score, in which the high sensitivity keywords (e.g., "confidential", "password", a name of a key user, etc.) may be kept in a manually-maintained list and may be customized (for example, by the users) for each organization; (vii) "low sensitivity keywords" may be used to reduce an asset sensitivity score, in which the low sensitivity keywords (e.g., "template") may be kept in a manually-maintained list and may be customized (for example, by the users) for each organization (a regular expression method may be used to detect the presence of keywords contained within an asset name); (viii) if a name of an asset belongs to a register of known sensitive assets (this may be determined by a third party application), then "known sensitive assets" may be configured to influence an asset sensitivity score, in which the level of influence may be modulated by factors such as, for example, a manual classification data (i.e., how old and potentially outdated is the asset); etc.

In one or more embodiments, the activity monitoring engine may identify the type of the asset as, for example (but not limited to): a doc/docx asset, a ppt/pptx asset, an xls/xlsx asset, a pdf asset, a zip/rar asset, an archive asset, etc.

In Step 312, the activity monitoring engine obtains, from the storage, a coefficient for each input feature based on the type of the asset. In one or more embodiments, the storage may include a separate model for each type of asset. Said another way, the storage may include a separate set of coefficients for each type of asset. In one or more embodiments, each coefficient may be fitted from training data for a specific type of asset, in which the ground-truth sensitivity score (e.g., the target for training) is known. Each coefficient may be selected by executing, for example, a "least-squares regression" model to minimize an error between the model predictions and the ground truth sensitivity scores.

In Step 314, the activity monitoring engine (more specifically, the analyzer) obtains an asset sensitivity score for the asset based on the input features (identified in Step 310) and the corresponding coefficients (obtained in Step 312). In one or more embodiments, the activity monitoring engine may employ a set of linear, non-linear, and/or ML models (based on the training data for the asset type) to obtain the asset sensitivity score. For example, the activity monitoring engine may execute a multiple linear regression model. As an extension of a "linear regression model", the "multiple linear regression model" refers to a statistical method that is used to predict the outcome of a variable based on a value of one or more variables. The variable that needs to be predicted is known as the "dependent" variable, while the variables that are used to predict the dependent variable are known as "independent" or "explanatory" variables.

Based on the linear model, input features, and corresponding coefficients, the activity monitoring engine may generate the following equation: inferred sensitivity score uncapped=$c\_0$ (e.g., a constant term that is an output of a linear model fitting procedure)+$c\_1 \times x\_1 + c\_2 \times x\_2 + \ldots + c\_n \times x\_n$, in which "$c\_0 \ldots c\_n$" represent the coefficients and "$x\_1 \ldots x\_n$" represent the input features. In one or more embodiments, the linear model may be fitted using a least squares regression method, based on a labeled data set that is stored in the storage. The administrator may re-fit the linear model when new labelled data becomes available because of a particular user or a use case.

For example, consider a scenario where (a) the fitted coefficients for an xlsx asset are: $c\_0$=4.5, $c\_1$ (for the "unique users")=−0.6, $c\_2$ (for the "unique key users")=2, $c\_3$ (for the "maximum asset size")=4.0E-10, $c\_4$ (for the "unique tags")=0, $c\_5$ (for the "asset version changes") =0.07, $c\_6$ (for the "high sensitivity keywords")=2, $c\_7$ (for the "low sensitivity keywords")=−0.5, and $c\_8$ (for the "known sensitive assets")=0, and (b) the input features for the xlsx asset are: $x\_1$ (unique users)=2, $x\_2$ (unique key users)=1, $x\_3$ (maximum asset size)=109056 Bytes, $x\_4$ (unique tags)=5, $x\_5$ (asset version changes)=100, $x\_6$ (high sensitivity keywords)=0, $x\_7$ (low sensitivity keywords)=0, and $x\_8$ (known sensitive assets)=0. Consequently, by incorporating the coefficients and input features simultaneously and jointly, the activity monitoring engine obtains the asset sensitivity score (the "inferred sensitivity score uncapped") as: $-0.6 \times 2 + 2 \times 2 + 4E-10 \times 109056 + 0 \times 5 + 0.07 \times 100 + 2 \times 0 - 0.5 \times 0 + 0 \times 0 = 14.3$. As indicated, the asset sensitivity score is not related to the content of the asset, rather it is related to the input features that are derived from the metadata.

Turning now to FIG. 3.2, the method shown in FIG. 3.2 may be executed by, for example, the above-discussed activity monitoring engine. Other components of the system (100) illustrated in FIG. 1 may also execute all or part of the method shown in FIG. 3.2 without departing from the scope of the invention.

In Step 316, a determination is made as to whether the type of the asset is pdf. Accordingly, in one or more embodiments, if the result of the determination is YES, the method proceeds to Step 338. If the result of the determination is NO, the method alternatively proceeds to Step 318.

In Step 318, as a result of the determination in Step 316 being NO, a second determination is made as to whether the type of the asset is archive. Accordingly, in one or more embodiments, if the result of the determination is YES, the method proceeds to Step 350. If the result of the determination is NO, the method alternatively proceeds to Step 320.

In Step 320, the activity monitoring engine maps the asset sensitivity score into a predetermined range (e.g., between [0, 10] interval) to obtain a scaled asset sensitivity score. In one or more embodiments, in order to map, the activity monitoring engine may use a non-linear function (e.g., a sigmoid function) such that the engine may obtain a transformed asset sensitivity score ("inferred sensitivity score"). For example, after implementing the non-linear function, the asset sensitivity score may be mapped into 10 from 14.3.

In Step 322, the activity monitoring engine obtains, based on the malicious activities (identified in Step 308 of FIG. 3.1), a malicious score for the asset. In one or more embodiments, for example, based on "aggregation—data archiving" and "exfiltration—obfuscated Internet asset upload" activities, the activity monitoring engine may obtain the malicious score as 0.4, in which (i) the total number of malicious tags are 5 and the number of malicious tags that apply to the asset is 2 and (ii) the malicious score=2/5=0.4.

In Step 324, similar to Step 320, the activity monitoring engine maps the malicious score into the predetermined range to obtain a scaled malicious score. In this manner, the malicious score may be mapped to 4.0 as following: 10 (scaled to the interval)×[2/5]=4.0.

In Step 326, the activity monitoring engine obtains, based on the data loss activities (identified in Step 308 of FIG. 3.1), a data loss score for the asset. In one or more embodiments, for example, based on "data loss—asset sharing website network activity" and "data loss—attempt to transfer an asset to an unauthorized removable storage media" activities, the activity monitoring engine may obtain the data loss score as 0.2, in which (i) the total number of data loss tags are 10 (see FIG. 4.3) and the number of data loss tags that apply to the asset is 2 and (ii) the data loss score=2/10=0.2.

In Step 328, similar to Step 320, the activity monitoring engine maps the data loss score into the predetermined range to obtain a scaled data loss score. In this manner, the data loss score may be mapped to 2.0 as following: 10 (scaled to the interval)×[2/10]=2.0.

In Step 330, the activity monitoring engine infers, based on the scaled asset sensitivity score (obtained in Step 320), scaled malicious score (obtained in Step 324), and scaled data loss score (obtained in Step 328), an asset risk score for the asset. For example, based on the following equation, the activity monitoring engine may infer the asset risk score as 60.0: asset risk score=[scaled malicious score (4.0)+scaled data loss score (2.0)]×scaled asset sensitivity score (10.0) =60.0. As indicated, the asset risk score is not related to the content of the asset, rather it is related to the input features and activities that are derived or inferred from the metadata.

In Step 332, the activity monitoring engine, based on the asset risk score (inferred in Step 330), tags (e.g., labels, marks, flags, etc.) the asset as a sensitive (e.g., important, confidential, etc.) asset or a non-sensitive asset. In one or more embodiments, if the asset risk score is above a predetermined asset risk score, the asset may be tagged as a sensitive asset based on its asset risk score. For example, if the predetermined asset risk score is 35, the asset may be tagged as a sensitive asset, because its asset risk score is 60.0.

In one or more embodiments, because the assets are part of a dynamic file system, sensitive-tagged assets may become non-sensitive, or non-sensitive-tagged assets may become sensitive over time (see FIG. 3.6). For example, at a first point in time, an asset may be tagged as a non-sensitive asset because a user with a user level of 2/10 was interacting with the asset; however, at a second point in time, the asset may be tagged as a sensitive asset because a user with a user level of 8/10 started to interact with the asset.

In one or more embodiments, the activity monitoring engine may include a feedback mechanism or may be a part of a feedback mechanism. Based on the feedback mechanism, the activity monitoring engine may execute a "history check" to determine whether (i) any activity (e.g., a malicious activity, a data loss activity, etc.) that occurred needs further (e.g., secondary) review (e.g., an activity deemed not a malicious activity, but now a malicious activity) or (ii) more metadata is available. For example, consider a scenario where an asset is tagged as a sensitive asset. Based on this, the activity monitoring engine may request, for example, a manual, human-based sampling process for that asset (or a periodic (e.g., every week) sampling process after tagging every $500^{th}$ asset) and use the output of the sampling process as a feedback to improve the asset risk score inferring efficiency of the linear model (hence its tagging efficiency). During the sampling process, the administrator (or a third party system) may determine that the asset should not be tagged as non-sensitive, because a user with a user level of 9/10 was interacted with the asset two days ago. In this manner, the activity monitoring engine may use this feedback as an input (i) to modify the linear model (used in Step 314 of FIG. 1) and (ii) to update the tagging of the corresponding asset.

In Step 334, the activity monitoring engine stores the asset risk score and the tagging information of the asset in the storage. In this manner, for example, sensitivity information of the asset may be tracked over time and updated when necessary.

In Step 336, the activity monitoring engine initiates displaying the asset risk score of the asset to the requesting entity. In one or more embodiments, the activity monitoring engine may use the visualization module's (e.g., 220, FIG. 2) GUI to display the asset risk score to the administrator (or other authorized entities) for further evaluation. The activity monitoring engine may also display the tagging information of the asset and information about the detected additional activities (e.g., compromised activities, non-malicious activities, behavioral activities, etc.) to the administrator. In one or more embodiments, the activity monitoring engine may further send (or display) a notification about a summary of the asset risk score of the asset to the user of the client.

In one or more embodiments of the invention, the method may end following Step 336.

Turning now to FIG. 3.3, the method shown in FIG. 3.3 may be executed by, for example, the above-discussed activity monitoring engine. Other components of the system (100) illustrated in FIG. 1 may also execute all or part of the method shown in FIG. 3.3 without departing from the scope of the invention.

In Step 338, as a result of the determination in Step 316 of FIG. 3.2 being YES and based on the asset lineage map, the activity monitoring engine identifies one or more assets that have the same asset name as the pdf type asset. Said another way, the activity monitoring engine may identify other versions of the same source asset. In one or more embodiments, the activity monitoring engine may identify other versions of the asset, for example, (i) if two assets have the same hash value but different asset names or (ii) if there are two different hash values (as a result of saving the asset both in pdf and docx formats) with the same asset name. For example, the activity monitoring engine may identify "projectsupportgrant.pdf" was generated from a Microsoft® Word document called "projectsupportgrant.docx".

In Step 340, similar to Step 310 of FIG. 3.1 and based on the asset lineage map, the activity monitoring engine identifies input features linked to the assets. Based on the above-discussed example in Step 338, the activity monitoring engine may identify input features of "projectsupportgrant.docx".

In Step 342, similar to Step 312 of FIG. 3.1, the activity monitoring engine obtains a coefficient for each input feature from the storage.

In Step 344, similar to Step 314 of FIG. 3.1, the activity monitoring engine obtains an asset sensitivity score for each asset based on the corresponding input features and coefficients of each asset. Based on the above-discussed example in Step 338, the activity monitoring engine may obtain 36.5 as the asset sensitivity score of "projectsupportgrant.docx", whereas the asset sensitivity score for "projectsupportgrant.pdf" was obtained as 25 in Step 314 of FIG. 3.1.

In Step 346, the activity monitoring engine compares the asset sensitivity score for the pdf type asset against the asset sensitivity scores for the assets (identified in Step 338).

In Step 348, based on the comparison (performed in Step 346), the activity monitoring engine assigns the highest asset sensitivity score to the pdf type asset as its asset sensitivity score. Based on Step 344, the activity monitoring agent may assign 36.5 as the asset sensitivity score of "projectsupportgrant.pdf", even though its original asset sensitivity score was 25. Thereafter, the method proceeds to Step 320 of FIG. 3.2, where the assigned sensitivity score is mapped into the predetermined range to obtain a scaled asset sensitivity score for "projectsupportgrant.pdf".

Turning now to FIG. 3.4, the method shown in FIG. 3.4 may be executed by, for example, the above-discussed activity monitoring engine. Other components of the system (100) illustrated in FIG. 1 may also execute all or part of the method shown in FIG. 3.4 without departing from the scope of the invention.

In Step 350, as a result of the determination in Step 318 of FIG. 3.2 being YES and based on the asset lineage map, the activity monitoring engine identifies one or more assets that are included in the archive type asset. For example, the activity monitoring engine may identify assets B-E are included in asset A (the archive type asset).

In Step 352, similar to Step 310 of FIG. 3.1 and based on the asset lineage map, the activity monitoring engine identifies input features linked to the included assets. Based on the above-discussed example in Step 350, the activity monitoring engine may identify input features linked to assets B-E.

In Step 354, similar to Step 312 of FIG. 3.1, the activity monitoring engine obtains a coefficient for each input feature from the storage.

In Step 356, similar to Step 314 of FIG. 3.1, the activity monitoring engine obtains an asset sensitivity score for each of the included assets based on the corresponding input features and coefficients. Based on the above-discussed example in Step 350, the activity monitoring engine may obtain (i) 28 as the asset sensitivity score of asset B, (ii) 12 as the asset sensitivity score of asset C, (iii) 17 as the asset sensitivity score of asset D, and (iv) 22 as the asset sensitivity score of asset E.

In Step 358, the activity monitoring engine selects the highest asset sensitivity score among the asset sensitivity scores for the included assets. Based on Step 356, the activity monitoring engine may select 28 as the highest asset sensitivity score.

In Step 360, based on selection (performed in Step 358), the activity monitoring engine assigns the selected asset sensitivity score to the archive type asset as its asset sensitivity score. Based on Step 358, the activity monitoring agent may assign 28 as the asset sensitivity score of asset A. Thereafter, the method proceeds to Step 320 of FIG. 3.2, where the assigned sensitivity score is mapped into the predetermined range to obtained a scaled asset sensitivity score for asset A.

FIGS. 3.5-3.7 show a method for implementing DLP based on a user risk score of a user and sensitivity of an asset in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.5, the method shown in FIG. 3.5 may be executed by, for example, the above-discussed activity monitoring engine. Other components of the system (100) illustrated in FIG. 1 may also execute all or part of the method shown in FIG. 3.5 without departing from the scope of the invention.

In Step 362, the activity monitoring engine receives a user risk calculation request for a user of the client from the administrator. In one or more embodiments, after performing the "asset risk score calculation" steps discussed above in reference to FIGS. 3.1-3.4, based on the administrator's request, the activity monitoring engine may perform "threat detection and prevention" steps discussed below (in reference to FIGS. 3.5-3.7).

In Step 364, in response to the request (received in Step 362), the activity monitoring engine identifies the user. In one or more embodiments, the activity monitoring engine may identify the user via a login screen displayed on the GUI (provided by the visualization module of the client). Once the login screen is displayed, the user may enter information (e.g., credentials) on the GUI. The activity monitoring engine may then identify the user based on the entered information. In one or more embodiments, the identified user may be, for example (but not limited to): an entry-level engineer, a board member, a senior vice president of development, a lead scientist, etc.

In Step 366, the activity monitoring engine determines a user level of the user (identified in Step 364). In order to determine the user level of the user, the activity monitoring engine may make an API call (over the network) to, for example, a database that keeps HR records and an active directory of the users to obtain user level details of the user. Based on receiving the API call from the activity monitoring engine, the database may allow the activity monitoring engine to obtain the user level details of the user.

In one or more embodiments, after obtaining the user level details, the activity monitoring engine may analyze them, for example, by checking the seniority level of the user, by checking the job tenure of the user, etc. Based on the analysis, the activity monitoring engine may determine that, for example, the user is an entry-level user and the user level of the user is 2/10, or the user is a lead scientist and the user level of the user is 7/10.

In Step 368, based on an asset lineage map, the activity monitoring engine identifies an asset linked to the user. In one or more embodiments, for example, based on an asset lineage map of asset A (generated before performing Step 368), the activity monitoring engine may identify that assets A-C, asset F, and asset X are linked to user 1.

In Step 370, based on the asset lineage map and similar to Step 308 of FIG. 3.1, the activity monitoring engine identifies one or more activities related to the identified asset and identified user. In one or more embodiments, the identified activities may be, for example (but not limited to): malicious activities, data loss activities, compromised activities, non-malicious activities, behavioral activities, etc. Details of the above-mentioned activities have been described above in reference to Step 308 of FIG. 3.1.

In Step 372, the activity monitoring engine obtains, from the storage, tagging information of the identified asset (in Step 368). In one or more embodiments, for example, the activity monitoring engine may obtain tagging information of asset A. Additionally, the activity monitoring engine may also obtain the asset risk score of asset A from the storage.

In Step 374, a third determination is made as to whether the identified asset is a sensitive asset. Accordingly, in one or more embodiments, if the result of the determination is YES, the method proceeds to Step 376. If the result of the determination is NO, the method alternatively proceeds to Step 386.

Further, in Step 374, the activity monitoring engine may also perform an "access validation" process. While performing this process, the activity monitoring engine may check whether the users that have access to sensitive assets across the organization match with the recorded user levels of those users. For example, consider a scenario where user 1 is an entry-level engineer and user 2 is a lead scientist. In this scenario, only user 2 should have access to sensitive assets across the engineering department; however, if user 1 can also access at least a part of those assets, the activity monitoring engine may (i) modify the linear model (discussed above in reference to Step 314 of FIG. 3.1) and/or (ii) may send a request to the HR department to update the recorded user level (and the associated user information) of user 1.

In Step 376, as a result of the determination in Step 374 being YES and based on a user risk model, the activity monitoring engine tags the user as a high-risk user. For example, consider a scenario where the identified asset is a sensitive asset and user 2 performs malicious activities using the identified asset (e.g., generating a data archive using the identified asset and deleting the archive afterwards, trying to transfer the identified asset to an unauthorized removable storage media, etc.). In this scenario, the activity monitoring engine may identify user 2 as a "bad actor" and may tag, based on the user risk model, user 2 as a "high-risk" user (e.g., as a malicious insider, as a negligent insider, as a credential thief, etc.).

As used herein, a "malicious insider" is a user who intentionally hurt the organization, whether through data theft or by sabotage.

As used herein, a "negligent insider" is a user who unintentionally put the organization's security at risk.

As used herein, a "credential thief" is an outside infiltrator who enter the organization through, for example, an employee account.

As yet another example, consider a scenario where the identified asset is a sensitive asset and user 2 performs non-malicious activities using the identified asset (e.g., reading the identified asset from an unapproved application). In this scenario, the activity monitoring engine may identify user 2 as a "good actor"; however, even though user 2, for example, not trying to steal the identified asset, the activity monitoring engine may identify user 2's activity as "user 2 handling a sensitive asset on a regular basis". Because of that, the activity monitoring engine may tag, based on the user risk model, user 2 as a "high-risk" user.

As yet another example, consider a scenario where the identified asset is a sensitive asset and user 1 has never interacted with the identified asset because of the user level of user 1. Based on these inputs and the user risk model, the activity monitoring engine may tag user 1 as a "low-risk" user. However, when the user level of user 1 increases to 7/10 (for example, due to a promotion), the activity monitoring engine may tag, based on the user risk model, user 1 as a "high-risk" user, even though user 1 has not interacted with the identified asset yet.

As yet another example, consider a scenario where the identified asset is a sensitive asset and user 3 has never interacted with the identified asset; however user 3 has interacted with other sensitive assets that are linked to the identified asset and user 3 performs malicious activities using the other sensitive assets. Because of that, the activity monitoring engine may tag, based on the user risk model, user 3 as a "high-risk" user, even though user 3 has not interacted with the identified asset yet.

The aforementioned examples are not intended to limit the scope of the invention.

In one or more embodiments, after tagging the user as a high-risk user, the activity monitoring engine may provide more details associated with the user to the administrator via the GUI of the visualization module. The activity monitoring engine may provide the details via a "user dashboard", in which the dashboard may specify, for example (but not limited to): (a) a list of assets that a user has interacted with; (b) "user 2 shows escalated behaviors in multiple malicious categories including "obfuscation—data archive creation and deletion". Additionally, potentially compromised activity related to "discovery" was elevated that could increase the possibility of a compromised account. User 2 also shows escalated behaviors in multiple data loss categories including "printing" activities. Unusual behavioral activity related to "flight risk" was also elevated for review"; (c) "user 3 shows escalated behaviors in multiple malicious categories including "obfuscation—data archive creation and deletion". Negligent activity related to multiple categories including "asset name with password in title" was also elevated for review. Additionally, potentially compromised activity related to "discovery" was elevated that could increase the possibility of a compromised account. User 3 also shows escalated behaviors in multiple data loss categories including "remote access tools" activities. Unusual behavioral activity related to "flight risk" was also elevated for review"; etc.

In Step 378, a fourth determination is made as to whether the activities (identified in Step 370) are malicious. Accordingly, in one or more embodiments, if the result of the determination is YES, the method proceeds to Step 380. If the result of the determination is NO, the method alternatively proceeds to Step 394.

In Step 380, as a result of the determination in Step 378 being YES, the activity monitoring engine takes a remedial action and implements (e.g., enforces) a "medium-level" DLP policy, which is the "DLP policy—zero trust level 3", in order to deter (e.g., restrict) the high-risk user. Details of the medium-level DLP policy have been described above in reference to FIG. 1.

In Step 382, a fifth determination is made as to whether the activities started to become more malicious after implementing the medium-level DLP policy. Accordingly, in one or more embodiments, if the result of the determination is YES, the method proceeds to Step 384. If the result of the determination is NO, the method alternatively ends.

In Step 384, as a result of the determination in Step 382 being YES, the activity monitoring engine takes a more intrusive action and implements a "high-level" DLP policy, which is the "DLP policy—zero trust level 4", in order to disrupt the high-risk user. Details of the high-level DLP policy have been described above in reference to FIG. 1.

In one or more embodiments, the method may end following Step 384.

Turning now to FIG. 3.6, the method shown in FIG. 3.6 may be executed by, for example, the above-discussed activity monitoring engine. Other components of the system (100) illustrated in FIG. 1 may also execute all or part of the method shown in FIG. 3.6 without departing from the scope of the invention.

In Step 386, as a result of the determination in Step 374 of FIG. 3.5 being NO, a sixth determination is made as to whether the user level of the user is greater than or equal to a user level threshold (e.g., 6 out of 10). Accordingly, in one or more embodiments, if the result of the determination is YES, the method proceeds to Step 388. If the result of the determination is NO, the method alternatively proceeds to Step 392.

In one or more embodiments, based on the above-discussed example in reference to Step 366 of FIG. 3.5, the activity monitoring engine may determine that the user level of the entry-level user is less than the user level threshold, whereas the user level of the lead scientist is greater than the user level threshold.

In Step 388, as a result of the determination in Step 386 being YES, the activity monitoring engine tags the identified asset (e.g., the initially deemed non-sensitive asset) as a sensitive asset, because a potentially high-risk user is interacting with the initially deemed non-sensitive asset. In this manner, for example, sensitivity information of the identified asset may be tracked over time and updated when necessary.

In Step 390, the activity monitoring engine updates the tagging information of the identified asset (e.g., the initially deemed non-sensitive asset) as a sensitive asset in the storage. Thereafter, the method proceeds to Step 376 of FIG. 3.5, where the user is tagged, based on the user risk model, as a "high-risk" user.

In Step 392, as a result of the determination in Step 386 being NO, the activity monitoring engine tags, based on the user risk model, the user as a "low-risk" user. For example, consider a scenario where the identified asset is a non-sensitive asset and user 1 performs non-malicious activities using the identified asset. In this scenario, the activity monitoring engine may identify user 1 as a "good actor" and may tag, based on the user risk model, user 1 as a "low-risk" user.

In one or more embodiments, the method may end following Step 392.

Turning now to FIG. 3.7, the method shown in FIG. 3.7 may be executed by, for example, the above-discussed activity monitoring engine. Other components of the system (100) illustrated in FIG. 1 may also execute all or part of the method shown in FIG. 3.7 without departing from the scope of the invention.

In Step 394, as a result of the determination in Step 378 of FIG. 3.5 being NO, the activity monitoring engine takes a remedial action and implements a "low-level" DLP policy, which is the "DLP policy—zero trust level 2", in order to deter the high-risk user. Details of the low-level DLP policy have been described above in reference to FIG. 1.

In Step 395, a seventh determination is made as to whether the activities started to become malicious after implementing the low-level DLP policy. Accordingly, in one or more embodiments, if the result of the determination is YES, the method proceeds to Step 396. If the result of the determination is NO, the method alternatively ends.

In Step 396, as a result of the determination in Step 395 being YES, the activity monitoring engine takes another remedial action and implements the medium-level DLP policy in order to deter the high-risk user.

In Step 397, an eighth determination is made as to whether the activities started to become more malicious after implementing the medium-level DLP policy. Accordingly, in one or more embodiments, if the result of the determination is YES, the method proceeds to Step 398. If the result of the determination is NO, the method alternatively ends.

In Step 398, as a result of the determination in Step 397 being YES, the activity monitoring engine takes a more intrusive action and implements the high-level DLP policy in order to disrupt the high-risk user.

In one or more embodiments, the method may end following Step 398.

Start of Example

The following section describes an example of one or more embodiments. The example, illustrated in FIGS. 4.1-4.4, is not intended to limit the scope of the embodiments disclosed herein and is independent from any other examples discussed in this application.

Turning to the example, consider a scenario in which FIG. 4.1 shows a dashboard displaying an asset lineage map of asset A (the target asset) and intrinsically related (e.g., linked) assets (asset B, asset C, asset F, and asset X). The dashboard provides contextual information about the target asset and the related assets, and identifies aggregation, obfuscation, and exfiltration activities. For the sake of brevity, not all components of the asset lineage map may be illustrated in FIG. 4.1.

Assume here that: (i) user 2 (domain\ariza) interacts with asset A (Model.xlsx) using application 4 (Microsoft® Excel- .exe) and (ii) user 1 (domain\bpeak) interacts with asset A, asset B (Design Files.rar), asset C (Equipment.zip), asset F (Unconfirmed 663844.crdownload), and asset X (Manufacturing.zip) using application 3 (Google® Chrome.exe), application 2 (Microsoft® Edge.exe), and application 1 (PKWARE® zip.exe).

As indicated in the lineage map, user 2 is in fact the generator of asset A because user 2 reads and modifies asset A, and changes attributes (e.g., asset security) and content of asset A at time 0 (e.g., 14 Nov. 2022) using application 4. At some later point in time (at time 1 (e.g., 18 Nov. 2022)), user 1 modifies asset F and renames it as asset A using application 3. The asset renaming activity shows that the renamed asset (asset A) is not the original asset A generated by user 2. At this point, the asset renaming activity raises a "behavior— unconfirmed asset extension renamed" alert, which affects the behavior-based asset risk score for asset A (see FIG. 4.3).

At time 1, user 1 also moves asset A and changes attributes of asset A using application 2. User 1 then deletes asset A using application 2. At this point, the asset deletion activity raises an "obfuscation—asset deletion" alert, which affects the behavior-based asset risk score for asset A. Further, at time 1, user 1 reads assets A, C, and X using Application 1. At this point, (i) the reading activity associated with asset X raises "aggregation—asset archive generation modified" and "aggregation/behavior—unauthorized asset access attempt" alerts; (ii) the reading activity associated with asset A raises "aggregation—data archiving", "aggregation/behavior—exfiltration archive collected data generation", "aggregation—asset archive generation modified", and "aggregation/behavior—unauthorized asset access attempt" alerts; and (iii) the reading activity associated with asset C raises "aggregation—asset archive generation modified" and "aggregation/behavior—unauthorized asset access attempt" alerts, which affect the behavior-based asset risk score for asset A.

In addition, at time 1, user 1 modifies asset B using application 1. At this point, the asset modification activity raises "aggregation—data archiving", "aggregation/behavior—exfiltration archive collected data generation", "aggregation—asset archive generation modified", and "aggregation/behavior—unauthorized asset access attempt" alerts, which affect the behavior-based asset risk score for asset A. Based on the activities performed using application 1, the application monitoring engine infers that user 1 generated an archive asset (asset B) from assets A, C, and X.

Turning now to FIG. 4.2, FIG. 4.2 shows a dashboard displaying an asset lineage map of asset E (the target asset) and intrinsically related assets (asset A, asset B, asset C, and asset X). The dashboard provides contextual information about the target asset and the related assets, and identifies aggregation, obfuscation, and exfiltration activities. For the sake of brevity, not all components of the asset lineage map may be illustrated in FIG. 4.2.

Assume here that: (i) user 1 interacts with assets A, B, C, and X using application 1, (ii) user 1 interacts with asset B and asset E (Cars.pdf) using application 2, and (iii) user 1 interacts with asset E using application 3.

As indicated in the lineage map, at time 2 (e.g., 19 Nov. 2022), user 1 reads assets A, C, and X using application 1. At this point, (i) the reading activity associated with asset X raises "aggregation—asset archive generation modified" and "aggregation/behavior—unauthorized asset access attempt" alerts, (ii) the reading activity associated with asset A raises "aggregation—data archiving", "aggregation/behavior—exfiltration archive collected data generation", "aggregation—asset archive generation modified", and "aggregation/behavior—unauthorized asset access attempt" alerts; and (iii) the reading activity associated with asset C raises "aggregation—asset archive generation modified" and "aggregation/behavior—unauthorized asset access attempt" alerts, which affect the behavior-based asset risk score for asset E (see FIG. 4.4).

At time 2, user 1 also creates asset B using application 1. At this point, the asset generation activity raises "aggregation—data archiving", "aggregation/behavior—exfiltration archive collected data generation", and "aggregation/behavior—unauthorized asset access attempt" alerts, which affect the behavior-based asset risk score for asset E.

Thereafter, at time 2, user 1 modifies asset B using application 1. At this point, the asset modification activity raises "aggregation—asset archive generation modified" and "aggregation/behavior—unauthorized asset access attempt" alerts, which affect the behavior-based asset risk score for asset E. Based on the activities performed using application 1, the application monitoring engine infers that user 1 generated an archive asset (asset B) from assets A, C, and X, and then modified asset B.

Further, at time 2, user 1 renames asset B as asset E using application 2. At this point, the asset renaming activity raises "obfuscation—asset upload" and "obfuscation—suspicious archive asset renaming" alerts, which affect the behavior-based asset risk score for asset E. User 1 then generates a copy of asset E using application 2. At this point, the asset duplication activity raises "behavior—asset extension transfer" alert, which affects the behavior-based asset risk score for asset E. User 1 then modifies asset E using application 2. Based on the activities performed using application 2, the application monitoring engine infers that (i) the renamed asset (asset E) is not an original pdf type asset generated by user 1, (ii) while renaming (e.g., converting into a pdf type asset), user 1 encrypted asset E, and (iii) after encrypting, user 1 duplicated and modified asset E.

At time 3 (e.g., 20 Nov. 2022), user 1 reads the duplicated asset E using application 3. At this point, the asset reading activity raises "exfiltration/data loss—asset read via browser", "data loss/exfiltration—posting data to website", "exfiltration—asset upload", and "data loss/exfiltration—personal webmail" alerts, which affect the behavior-based asset risk score for asset E. Based on the activities performed using application 3, the application monitoring engine infers that user 1 exfiltrated the duplicated asset E.

After the exfiltration event, user 1 deletes the duplicated asset E using application 2. At this point, the asset deletion activity raises an "obfuscation—asset deletion" alert, which affects the behavior-based asset risk score for asset E.

Turning now to FIG. 4.3, FIG. 4.3 shows a dashboard displaying the behavior-based asset risk score for asset A. The dashboard provides contextual information about the raised alerts and the resulting asset risk score for asset A in a plain and convenient way. For the sake of brevity, not all components of the dashboard may be illustrated in FIG. 4.3.

Assume here that the dashboard includes: (i) an "asset risk score" panel, (ii) an "activity score" panel, and (iii) an "icons" panel. The activity score panel includes "malicious score", "data loss score", and "inferred asset sensitivity score" sections. The icons panel includes "malicious icons", "data loss icons", and "asset sensitivity icons" sections, in which (a) the malicious icons section includes: (i) "aggregation" icon, (ii) "obfuscation" icon, and (iii) "exfiltration" icon; (b) the data loss icons section includes: (i) "Apple® AirDrop" icon, (ii) "Bluetooth" icon, (iii) "asset sharing application" icon, (iv) "asset sharing site" icon, (v) "asset transfer protocol" icon, (vi) "instant messaging application" icon, (vii) "printing" icon, (viii) "remote access tool" icon, (ix) "universal serial bus (USB)" icon, and (x) "personal webmail" icon; and (c) the asset sensitivity icons section includes: (i) "N number of unique user(s)" icon, (ii) "N number of unique key user(s)" icon, (iii) "maximum asset size" icon, (iv) "unique tags" icon, (v) "asset version changes" icon, (vi) "high sensitivity keywords" icon, (vii) "low sensitivity keywords" icon, and "known sensitive assets" icon.

Based on the asset lineage map of asset A, generator of asset A, detected activities, and raised alerts associated with asset A (e.g., the parameters of asset A), the activity monitoring engine executes the linear model and marks (illustrated by upward diagonal stripes) the following icons in the dashboard: (i) and (ii) under the malicious icons section; and (i), (ii), (iv), (v), and (viii) under the asset sensitivity icons section. Further, while marking the icons under the asset sensitivity icons section, the activity monitoring engine adds the following information to the corresponding icon: (i) "2 unique users", (ii) "at least one user with a higher propensity to generate or handle sensitive assets has been identified", (iv) "5 unique tags (behaviors)", (v) "100 versions of asset A exist", and (viii) "asset A has been classified by a third party application as a sensitive asset. The outside classification has been included in the sensitivity score".

Further, based on the parameters of asset A, the activity monitoring engine obtains a malicious score of 4.0, a data loss score of 0.0, and an inferred asset sensitivity score of 10 for asset A. Thereafter, based on the malicious score, data loss score, and inferred asset sensitivity score for asset A, the activity monitoring engine infers an asset risk score of 40.0 for asset A as following: asset risk score=[malicious score (4.0)+data loss score (0.0)]×inferred asset sensitivity score (10.0)=40.0. As seen in FIG. 4.3, each score under the activity score panel is illustrated by a portion of a corresponding box filled with upward diagonal stripes.

The activity monitoring engine then displays (via the visualization module) the dashboard to the administrator in order to (i) describe asset A and (ii) provide contextual information about the raised alerts and the resulting asset risk score for asset A.

Thereafter, based on the information available on the dashboard, the administrator sends a request to the activity monitoring engine in order to implement a medium-level DLP policy on user 1 because (i) asset A is a sensitive asset (its inferred asset sensitivity score is 10.0), (ii) user 1 is a high-risk user (user 1 is a board member), and (iii) user 1 performs malicious activities using asset A. Based on the request, the activity monitoring engine implements the medium-level DLP policy on user 1.

Turning now to FIG. 4.4, FIG. 4.4 shows a dashboard displaying the behavior-based asset risk score for asset E. The dashboard provides contextual information about the raised alerts and the resulting asset risk score for asset E in a plain and convenient way. For the sake of brevity, not all components of the dashboard may be illustrated in FIG. 4.4.

Assume here that the dashboard includes: (i) an "asset risk score" panel, (ii) an "activity score" panel, and (iii) an "icons" panel. The activity score panel includes "malicious score", "data loss score", and "inferred asset sensitivity score" sections. The icons panel includes "malicious icons", "data loss icons", and "asset sensitivity icons" sections, in which (a) the malicious icons section includes: (i) "aggregation" icon, (ii) "obfuscation" icon, and (iii) "exfiltration" icon; (b) the data loss icons section includes: (i) "Apple® AirDrop" icon, (ii) "Bluetooth" icon, (iii) "asset sharing application" icon, (iv) "asset sharing site" icon, (v) "asset transfer protocol" icon, (vi) "instant messaging application" icon, (vii) "printing" icon, (viii) "remote access tool" icon, (ix) "USB" icon, and (x) "personal webmail" icon; and (c) the asset sensitivity icons section includes: (i) "N number of unique user(s)" icon, (ii) "N number of unique key user(s)" icon, (iii) "maximum asset size" icon, (iv) "unique tags" icon, (v) "asset version changes" icon, (vi) "high sensitivity keywords" icon, (vii) "low sensitivity keywords" icon, and "known sensitive assets" icon.

Based on the asset lineage map of asset E, generator of asset E, detected activities, and raised alerts associated with asset E (e.g., the parameters of asset E), the activity monitoring engine executes the linear model and marks (illustrated by upward diagonal stripes) the following icons in the dashboard: (i)-(iii) under the malicious icons section; (x) under the data loss icons section; and (iv) and (vi) icons under the asset sensitivity icons section. Further, while marking the icons under the asset sensitivity icons section, the activity monitoring engine adds the following information to the corresponding icon: (iv) "6 unique tags" and (vi) "1 high sensitivity keyword".

Further, based on the parameters of asset E, the activity monitoring engine obtains a malicious score of 10.0, a data loss score of 0.9, and an inferred asset sensitivity score of 1.9 for asset E. Thereafter, based on the malicious score, data loss score, and inferred asset sensitivity score for asset E, the activity monitoring engine infers an asset risk score of 20.7 for asset E as following: asset risk score=[malicious score (10.0)+data loss score (0.9)]×inferred asset sensitivity score (1.9)=20.7. As seen in FIG. 4.4, each score under the activity score panel is illustrated by a portion of a corresponding box filled with upward diagonal stripes.

The activity monitoring engine then displays (via the visualization module) the dashboard to the administrator in order to (i) describe asset E and (ii) provide contextual information about the raised alerts and the resulting asset risk score for asset E.

Thereafter, based on the information available on the dashboard, the administrator sends a request to the activity monitoring engine in order to implement a medium-level DLP policy on user 1 because (i) user 1 is a high-risk user and (ii) user 1 performs malicious activities using asset E (even though asset E is a non-sensitive asset (its inferred asset sensitivity score is 1.9)). Based on the request, the activity monitoring engine implements the medium-level DLP policy on user 1.

End of Example

Turning now to FIG. 5, FIG. 5 shows a diagram of a computing device in accordance with one or more embodiments of the invention.

In one or more embodiments of the invention, the computing device (500) may include one or more computer processors (512), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for implementing data loss prevention (DLP), the method comprising:
receiving an asset risk score calculation request for an asset from an administrator,
wherein the administrator has sent the request because of an alert triggered in a client,
wherein the alert specifies a malicious activity performed by a compromised user using the asset;
obtaining, in response to the request, file system metadata for the asset in the client,
wherein the file system metadata specifies an offset for data of the asset stored in a storage, an access control list of the asset, a number of users interacting with the asset, and a number of size changes associated with the asset;
analyzing the file system metadata to generate an asset lineage map,
wherein, while generating the asset lineage map, the file system metadata, a reduced identifier of the asset, and a hash of a file system activity related to the asset are used;
identifying, based on the asset lineage map, input features linked to the asset, a type of the asset, and a plurality of activities linked to the asset,
wherein the input features comprise a number of predetermined sensitive keywords in an identifier of the asset and a key user that has interacted with the asset,
wherein the key user has a high propensity to interact with sensitive assets;
obtaining, based on the type of the asset, coefficients for the input features;
executing, based on the input features and the coefficient, a model to obtain an asset sensitivity score for the asset;
obtaining, based on the plurality of activities, a malicious score and a data loss score for the asset;
determining, based on the asset sensitivity score, the malicious score, and the data loss score, an asset risk score;
determining a user level of the compromised user;
making a determination, based on the asset risk score, that the asset is a sensitive asset;
tagging, based on the user level of the compromised user and the asset risk score of the sensitive asset, the compromised user as a high-risk user;
making a second determination that the plurality of activities are malicious; and
implementing, based on the second determination, a medium-level DLP policy to deter the compromised user.

2. The method of claim 1, further comprising:
making a third determination, after implementing the medium-level DLP policy, that a second plurality of activities has a higher level of risk; and
implementing, based on the third determination, a high-level DLP policy to disrupt the user.

3. A system for implementing data loss prevention (DLP), the system comprising:
a processor comprising circuitry;
memory comprising instructions, which when executed perform a method, the method comprising:
receiving an asset risk score calculation request from an administrator,
wherein the administrator has sent the request because of an alert triggered in a client,
wherein the alert specifies a malicious activity performed by a user;
obtaining, in response to the request, file system metadata for an asset in the client,
wherein the file system metadata specifies an offset for data of the asset stored in a storage, an access control list of the asset, a number of users interacting with the asset, and a number of size changes associated with the asset;

analyzing the file system metadata to generate an asset lineage map,
  wherein, while generating the asset lineage map, the file system metadata, a reduced identifier of the asset, and a hash of a file system activity related to the asset are used;
identifying, based on the asset lineage map, an input feature linked to the asset, a type of the asset, and a plurality of activities linked to the asset,
  wherein the input feature is a number of pre-determined sensitive keywords in an identifier of the asset;
obtaining, based on the type of the asset, a coefficient for the input feature;
executing, based on the input feature and the coefficient, a model to obtain an asset sensitivity score for the asset;
obtaining, based on the plurality of activities, a malicious score and a data loss score for the asset;
determining, based on the asset sensitivity score, the malicious score, and the data loss score, an asset risk score;
initiating a display of the asset risk score to the user, wherein the client provides a service to the user;
determining a user level of the user;
making a determination, based on the asset risk score, that the asset is a sensitive asset;
tagging, based on the user level of the user and the asset risk score of the sensitive asset, the user as a high-risk user;
making a second determination that the plurality of activities are malicious;
implementing, based on the second determination, a medium-level DLP policy to deter the user;
making a third determination, after implementing the medium-level DLP policy, that the plurality of activities has a higher level of risk; and
implementing, based on the third determination, a high-level DLP policy to disrupt the user.

4. The system of claim 3, wherein the medium-level DLP policy comprises implementing an intrusive monitoring on the user by recording the user's display screen.

5. The system of claim 3, wherein the high-level DLP policy comprises removing the user's network access.

* * * * *